United States Patent
Kosugi et al.

(10) Patent No.: US 7,575,083 B2
(45) Date of Patent: Aug. 18, 2009

(54) AUTOMATIC TRANSMISSION FOR A MOTORCYCLE

(75) Inventors: Makoto Kosugi, Shizuoka-ken (JP);
Sadamu Iwanaga, Shizuoka-ken (JP);
Takuji Murayama, Shizuoka-ken (JP);
Kimio Matsuda, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 450 days.

(21) Appl. No.: 11/255,768

(22) Filed: Oct. 21, 2005

(65) Prior Publication Data

US 2006/0094567 A1    May 4, 2006

(30) Foreign Application Priority Data

Oct. 21, 2004   (JP)   ............... 2004-307185
Sep. 7, 2005    (JP)   ............... 2005-258821

(51) Int. Cl.
  *B62D 61/02* (2006.01)
  *B62K 11/02* (2006.01)
(52) U.S. Cl. .............. 180/219; 180/229; 180/230; 180/291; 477/175
(58) Field of Classification Search ............ 180/219, 180/230, 291, 229; 477/175
See application file for complete search history.

(56) References Cited

U.S. PATENT DOCUMENTS

| 2,600,767 A | 6/1952 | Herrell |
| 2,936,868 A | 5/1960 | Myers |
| 3,215,234 A * | 11/1965 | Hirano .................. 192/54.4 |
| 4,497,222 A | 2/1985 | Nagaoka et al. |
| 5,121,649 A * | 6/1992 | Randriazanamparany et al. ................. 74/335 |
| 5,360,381 A * | 11/1994 | Swist .................. 477/175 |

(Continued)

FOREIGN PATENT DOCUMENTS

EP      0952078 A2    10/1999

(Continued)

OTHER PUBLICATIONS

European Search Report, dated Oct. 16, 2008; 6 pages.

*Primary Examiner*—Lesley D Morris
*Assistant Examiner*—Marlon A Arce
(74) *Attorney, Agent, or Firm*—Knobbe, Martens, Olson & Bear, LLP

(57) ABSTRACT

In order to reduce the influences of engine heat and vibration on a shift actuator, a shift actuator is disposed apart from the engine and the transmission on a vehicle. In particular a straddle-type vehicle, the vehicle includes a head pipe and a body frame including a main frame that extends rearward from the head pipe. The engine is suspended by the body frame 2 and a transmission is disposed next to the engine. The transmission includes a shift mechanism having a multiple-step speed change gear and a clutch mechanism that interrupts the transmission of rotation at the switching of the speed change gear of the transmission 40. An automatic transmission control unit operates the clutch mechanism and switches the speed change gear of the transmission automatically. The automatic transmission control unit includes the shift actuator which is mounted to the body frame and is disposed opposite to the transmission with the body frame therebetween, as viewed from the side of the vehicle, for operating the shift mechanism. A shift rod joins together the shift mechanism and the shift actuator.

20 Claims, 19 Drawing Sheets

U.S. PATENT DOCUMENTS

| | | | |
|---|---|---|---|
| 6,131,682 A * | 10/2000 | Walker | 180/219 |
| 6,257,081 B1 * | 7/2001 | Gagnon et al. | 74/335 |
| 6,308,797 B1 * | 10/2001 | Hacker et al. | 180/230 |
| 6,524,224 B2 * | 2/2003 | Gagnon et al. | 477/175 |
| 6,564,663 B2 | 5/2003 | Rioux et al. | |
| 6,931,839 B2 | 8/2005 | Foster | |
| 7,174,984 B2 * | 2/2007 | Kosugi et al. | 180/219 |
| 7,380,630 B2 * | 6/2008 | Yamada et al. | 180/230 |
| 2004/0093974 A1 | 5/2004 | Nesseth | |
| 2006/0094567 A1 * | 5/2006 | Kosugi et al. | 477/129 |

FOREIGN PATENT DOCUMENTS

| | | |
|---|---|---|
| JP | 2003341376 | 3/2003 |
| JP | 2003-320861 | * 11/2003 |

* cited by examiner

AUTOMATIC TRANSMISSION FOR A MOTORCYCLE

CROSS-REFERENCE TO RELATED APPLICATIONS

The present application is based on and claims priority under 35 U.S.C. § 119 to Japanese Patent Application No. 2004-307185, filed on Oct. 21, 2004; and Japanese Patent Application No. 2005-258821, filed Sep. 7, 2005, the entire contents of which is expressly incorporated by reference herein.

BACKGROUND OF THE INVENTION

1. Field of the Invention

The present invention relates to a straddle-type vehicle that is improved in the arrangement of an automatic transmission control unit.

2. Description of the Related Art

Known straddle-type vehicles include motorcycles. Motorcycles generally have a transmission. The rotation of the crankshaft of an engine is changed by the transmission and transmitted to a powered wheel. The transmission includes a shift mechanism having a main shaft, a drive shaft, and a multiple-step speed change gear, and a clutch mechanism that interrupts the transmission of the rotation at the switching of the speed change gear. Another known motorcycle has an automated manual transmission mechanism for automatically operating the clutch mechanism and switching the speed change gear of the transmission (for example, see Japanese Patent Publication No. JP-A-2003-320861 (pp. 1-6, FIGS. 1-7)).

Since the shift actuator of the conventional automated manual transmission mechanism has been disposed behind the engine and directly on the engine, the shift actuator is vulnerable to the heat and vibration of the engine. Also, since the shift actuator has been disposed between the engine and the body frame, a space for the shift actuator has been needed between the engine and the body frame, thus posing the problem of difficulty in reducing the size of the entire vehicle.

SUMMARY OF THE INVENTION

An aspect of the present invention involves a vehicle comprising a head pipe, a body frame including a main frame extending rearward from the head pipe, and an engine supported at least in part on the body frame. A transmission operates between the engine and a drive shaft, and the transmission includes a multiple-step shift mechanism. A clutch mechanism interrupts the transmission of power from the engine to the transmission at least when operating the shift mechanism. The vehicle also includes an automatic transmission control unit that operates the clutch mechanism and switches the shift mechanism automatically. The automatic transmission control unit includes a shift actuator that is mounted to the body frame and is disposed apart from the transmission with the body frame disposed therebetween, as viewed from the side of the vehicle. A shift-power transmission member couples together the shift mechanism and the shift actuator.

According to aspect of the invention, the shift actuator is disposed opposite to the transmission with the body frame therebetween, as viewed from the side, and is joined to the shift mechanism via the shift-power transmission member, whereby being mounted to the body frame. Thus the shift actuator is not directly mounted to the engine. This structure can reduce the influences of the heat and vibration of the engine on the shift actuator. Also, since the shift actuator can be disposed compact in a position in which it does not overlap with the main frame as viewed from the side while it is prevented from projecting to the side of the vehicle, thus reducing influence on the posture of a driver.

In accordance with another aspect of the present invention, there is provided a vehicle comprising a body frame supporting at least in part an engine and a transmission. The transmission operates between the engine and at least one wheel of the vehicle, and includes a clutch mechanism and a shift mechanism. A controller communicates with an automatic transmission control unit that is connected to the clutch mechanism and the shift mechanism so as to actuate these mechanisms. The controller is configured at least to control the automatic transmission control unit so as to operate the clutch mechanism and the shift mechanism in a synchronized manner. At least part of the automatic transmission control unit is supported by the frame apart from the engine and the transmission.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 19 figures.

DETAILED DESCRIPTION OF THE PREFERRED EMBODIMENT

The present automatic transmission is described below in the context of a motorcycle. However, the application of the present invention is not so limited and can be employed with other types of vehicles, such as, for example, scooters, ATV's, dirt bikes, side-by-sides, buggies, tricycles, carts, and the like.

Figure 1:
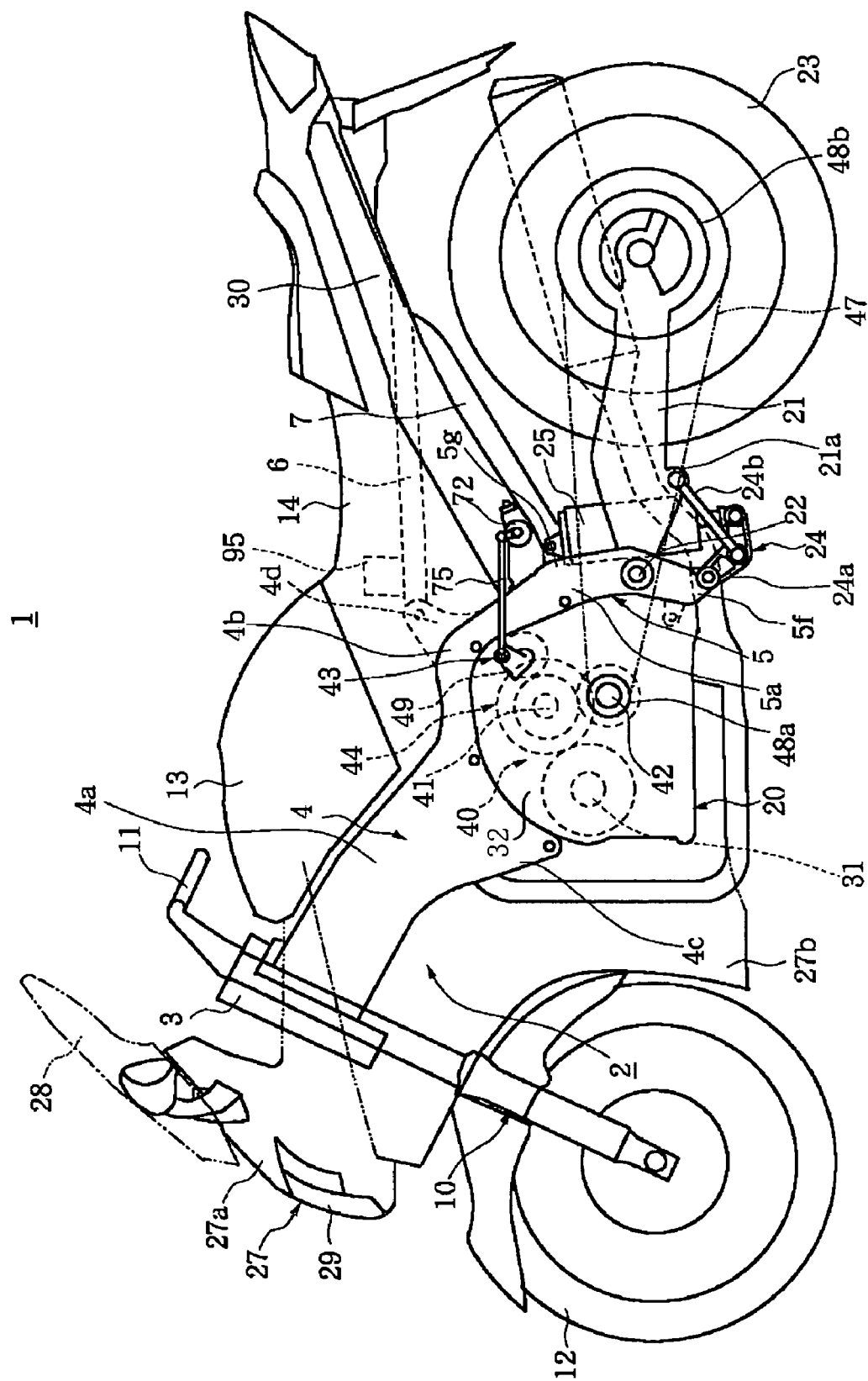
FIG. 1 is a side view of a motorcycle including an automatic transmission configured in accordance with a preferred embodiment of the present invention.
Figure 2:
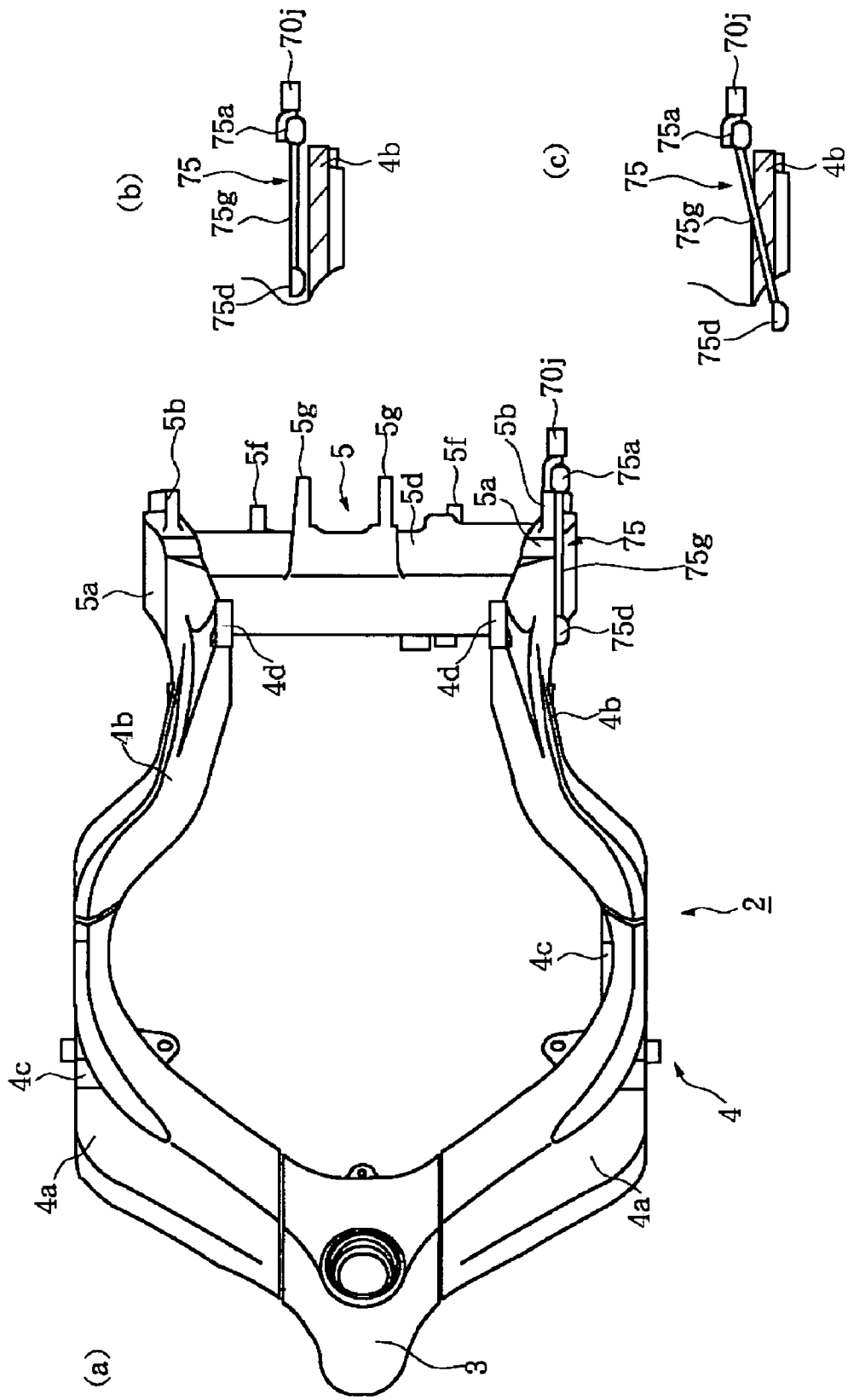
FIG. 2(a) is a plan view of a body frame of the motorcycle, isolated from the other components of the motorcycle.
FIGS. 2(b) and 2(c) are partial cross-sectional views of the body frame of FIG. 2(a) and illustrate two other positions for a portion of transmission relative to the body frame.
Figure 3:
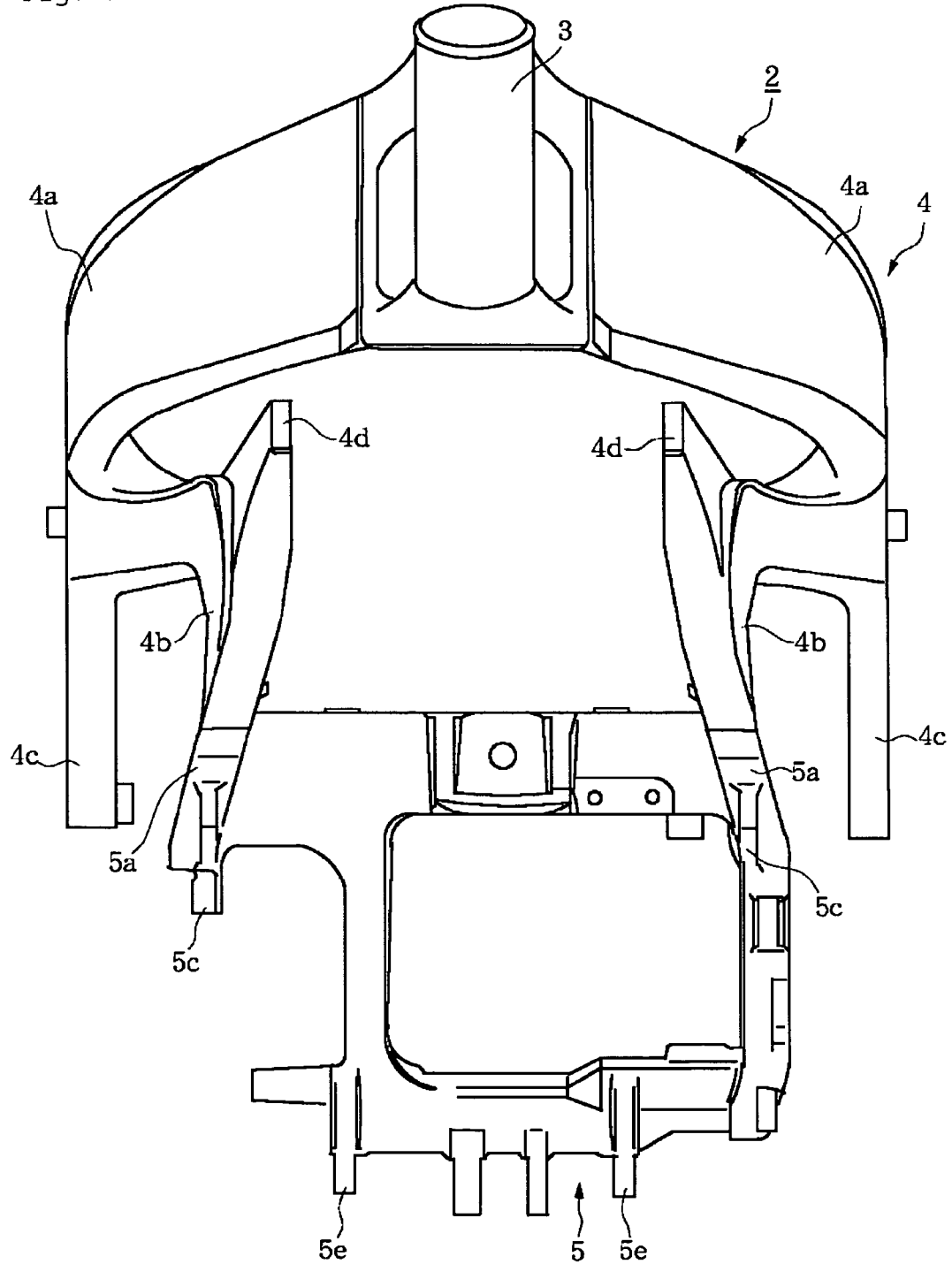
FIG. 3 is a front elevational view of the body frame of FIG. 2(a).

As shown in FIG. 1, a motorcycle 1 according to the embodiment includes a head pipe 3 and a body frame 2. The body frame 2 preferably includes at least a main frame 4 extending rearward from the head pipe 3 and a rear-arm bracket 5 extending downward from the rear of the main frame 4. As best seen in FIG. 2, the main frame 4 includes two frame members 4a that extend to the right and to left rear from the head pipe 3. The rears of the two frame members 4a slope downward to connect to the rear-arm bracket 5. As shown in FIGS. 2(a) and 3, the portions 4b of the frame members 4a, which connect to the rear-arm bracket 5, are bent inward along the width of the vehicle to form a smaller width. The two frames 4a each have an engine mounting portion 4c, which are best seen in FIG. 3, that extend downward at the lower part and a seat-rail mounting portion 4d that extends upward at the rear of each frame 4a. Of course, the present automatic transmission can be used with vehicles and other powered devices have other frame configurations (including a uni-body construction). Additionally, as used herein, As used herein, the phrase "the main frame extends rearward from the head pipe" indicates that the main frame extends rearward relative to the head pipe in a broad sense, including a structure in which the main frame extends from the head pipe to the lower rear, as described in the following embodiment.

Right and left upper parts 5a of the rear-arm bracket 5 connect to the connecting portions 4b of the frames 4a. The upper parts 5a of the rear-arm bracket 5 each have a back stay mounting portion 5b that extends backward (as seen in FIG. 2(a)) and an engine mounting portion 5c that extends forward (as seen in FIG. 3). With reference now to FIGS. 2(a) and 3, the member 5d of the rear-arm bracket 5 has engine mounting portions 5e extending forward (refer to FIG. 3), and link mounting portions 5f and cushion mounting portions 5g, which extend backward.

Figure 4:
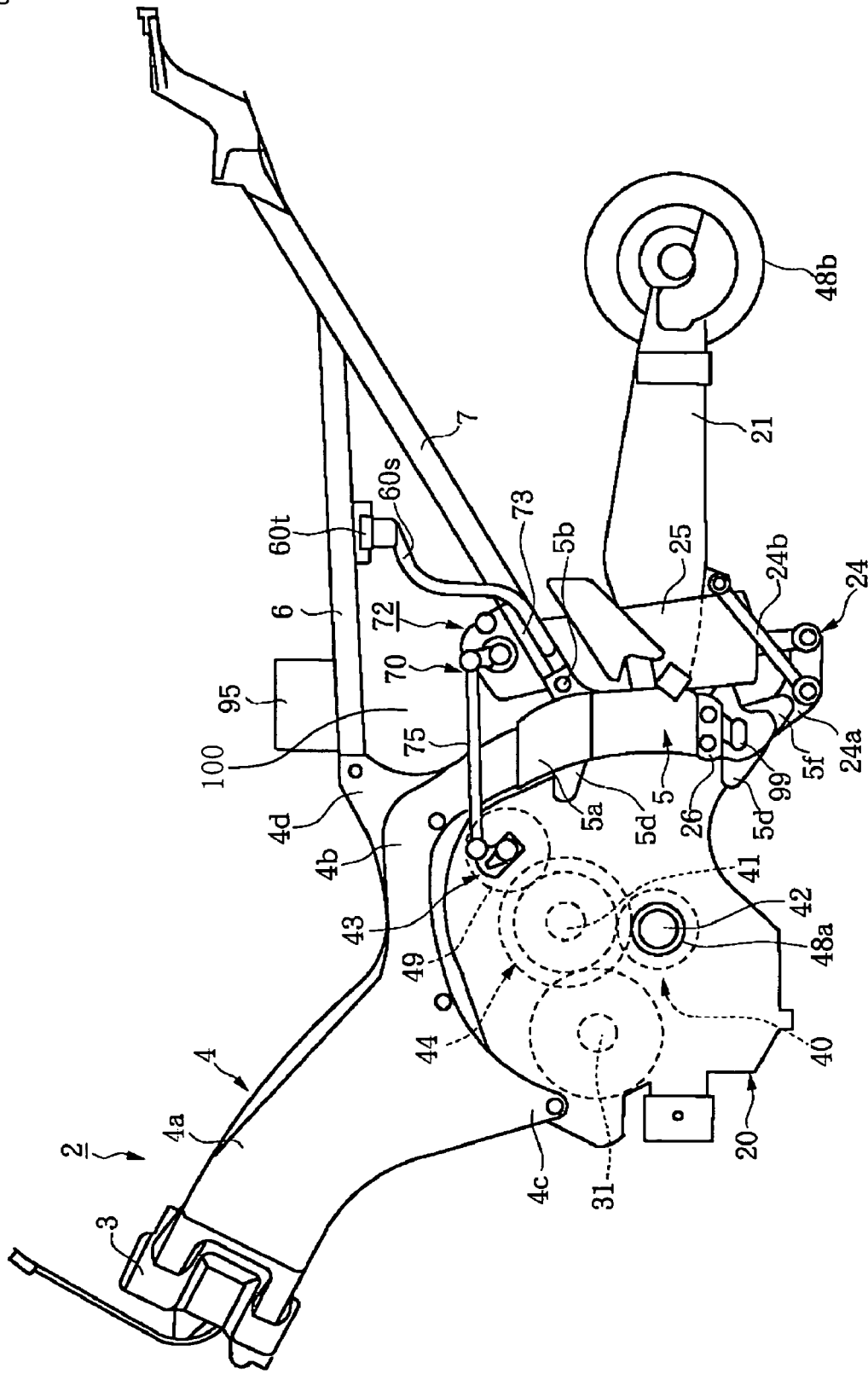
FIG. 4 is a side elevational view of a portion of the motorcycle showing the arrangement of the actuator of an automatic transmission control unit for the transmission illustrated in FIG. 1.

As seen in FIG. 4, the front of a seat rail 6 is mounted to the seat-rail mounting portion 4d, and a back stay 7 preferably is mounted to the back stay mounting portions 5b. The rear of the seat rail 6 and the rear of the back stay 7 desirably are joined together.

With reference now back to FIG. 1, a front fork 10 pivots in the head pipe 3. At the upper end of the front fork 10, a steering handle 11 is disposed; at the lower end, a front wheel 12 is disposed. In the illustrated embodiment, a fuel tank 13 is disposed on the main frame 4. Behind the fuel tank 13, a seat 14 is disposed. The seat 14 is placed on the seat rail 6.

The main frame 4 and the rear-arm bracket 5 preferably hold an engine 20. In the illustrated embodiment, the engine 20 is supported by the engine mounting portions 4c and the frame members 4a of the main frame 4, and is also supported by the engine mounting portions 5c (refer to FIG. 5) and the engine mounting portions 5e (refer to FIG. 3) of the rear-arm bracket 5.

The rear-arm bracket 5 supports the front end of a rear arm 21 around a pivot shaft 22 so as to allow the rear arm 21 to swing up and down. The rear end of the rear arm 21 supports a rear wheel 23. In the illustrated embodiment, the rear arm 21 is supported by the body frame 2 via a link mechanism 24 and a rear shock absorber 25. The link mechanism 24 has a vehicle-body side link 24a and a rear-arm side link 24b. A first end of the vehicle-body side link 24a rotatably connects to the link mounting portions 5f of the rear-arm bracket 5. A first end of the rear-arm side link 24b rotatably connects to a link mounting portion 21a of the rear arm 21. The center of the vehicle-body side link 24a and a second end of the rear-arm side link 24b are rotatably joined together. The lower part of the rear shock absorber 25 is supported by a second end of the vehicle-body side link 24a, and the upper part is supported by the cushion mounting portions 5g. The rear shock absorber 25 is disposed behind the rear-arm bracket 5. Of course, the present automatic transmission can be used with vehicles having types and configurations of suspensions other than the illustrated mono-shock arrangement.

As seen in FIG. 4, the rear-arm bracket 5 has step brackets 26 protruding backward. Steps or pegs 99 for a driver on which to place his or her feet extend from the step brackets 26 outward from the sides of the motorcycle.

As shown in FIG. 1, the body frame 2 also preferably supports a cowling 27. In the illustrated embodiment, the cowling 27 includes an upper cowling 27a that covers the front of the steering handle 11 and a lower cowling 27b that covers the front and the right and left sides of the main frame 4 and the right and left lower parts of the engine 20. The upper cowling 27a is supported by the body frame 2 via one or more stays (not shown). The upper cowling 27a forms the front surface and the right and left sides of the vehicle. The upper cowling 27a has a transparent screen 28 and a head lamp 29 mounted to the front upper part of the vehicle. The back stays 7 have side covers 30 for covering the right and left sides of the seat 14 and a space above the rear wheel 23.

The engine 20 of this embodiment is of a water-cooled, four-cycle parallel four-cylinder type. In the engine 20, a cylinder axis (not shown) cants to the front at a slight angle relative to a horizontal line, and a crankcase 32 containing a crankshaft 31 is suspended on both sides along the width of the vehicle by the body frame 2. The engine 20, however, is not limited to this particular construction. Engines having other numbers of cylinders, having other cylinder arrangements (e.g., V-shaped), and operating on other combustion principles (e.g., 2-stroke, crankcase compression) can be used as well with the present automatic transmission.

Figure 5:
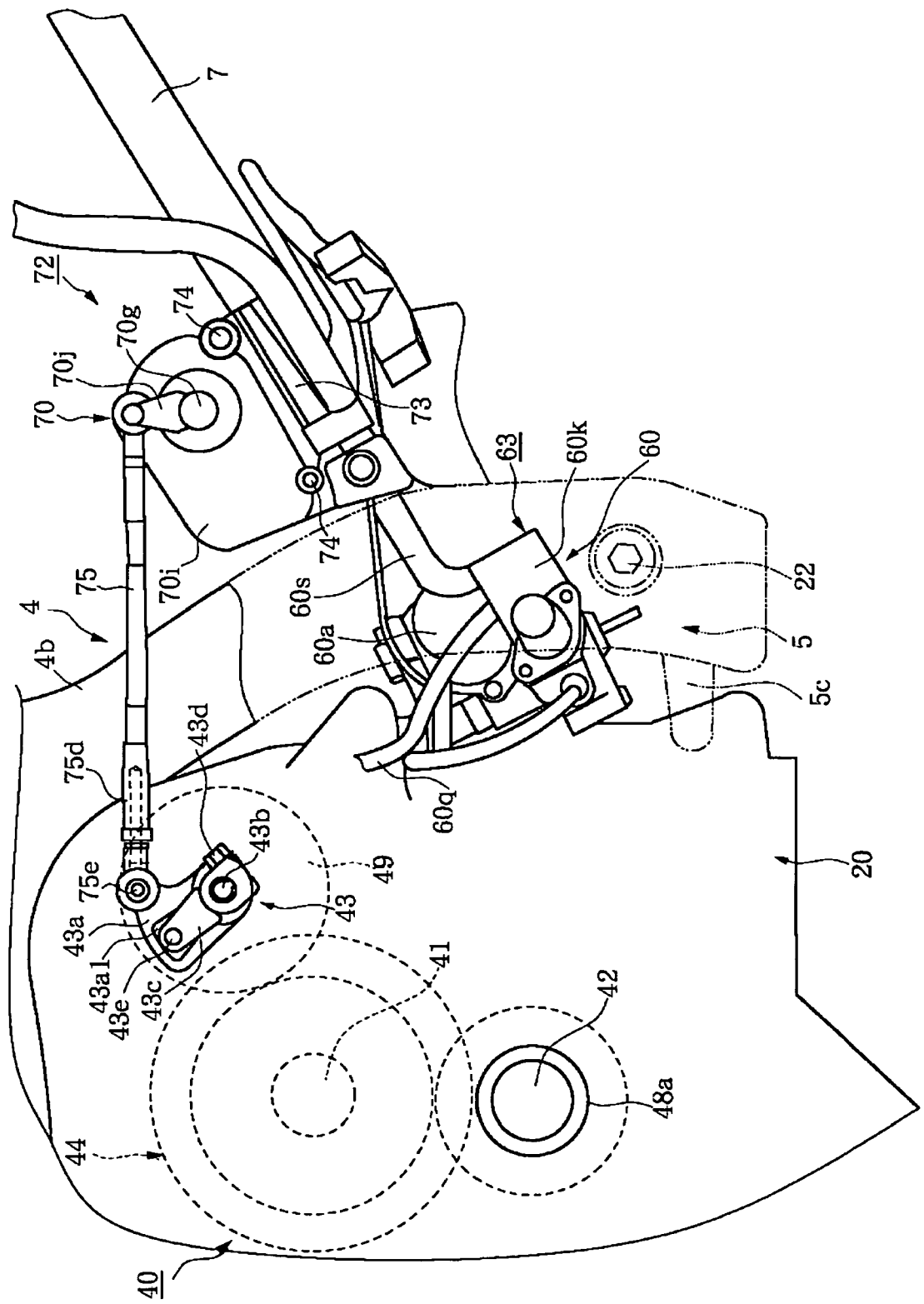
FIG. 5 is an enlarged side view showing the arrangement of the actuator of FIG. 4.
Figure 10:
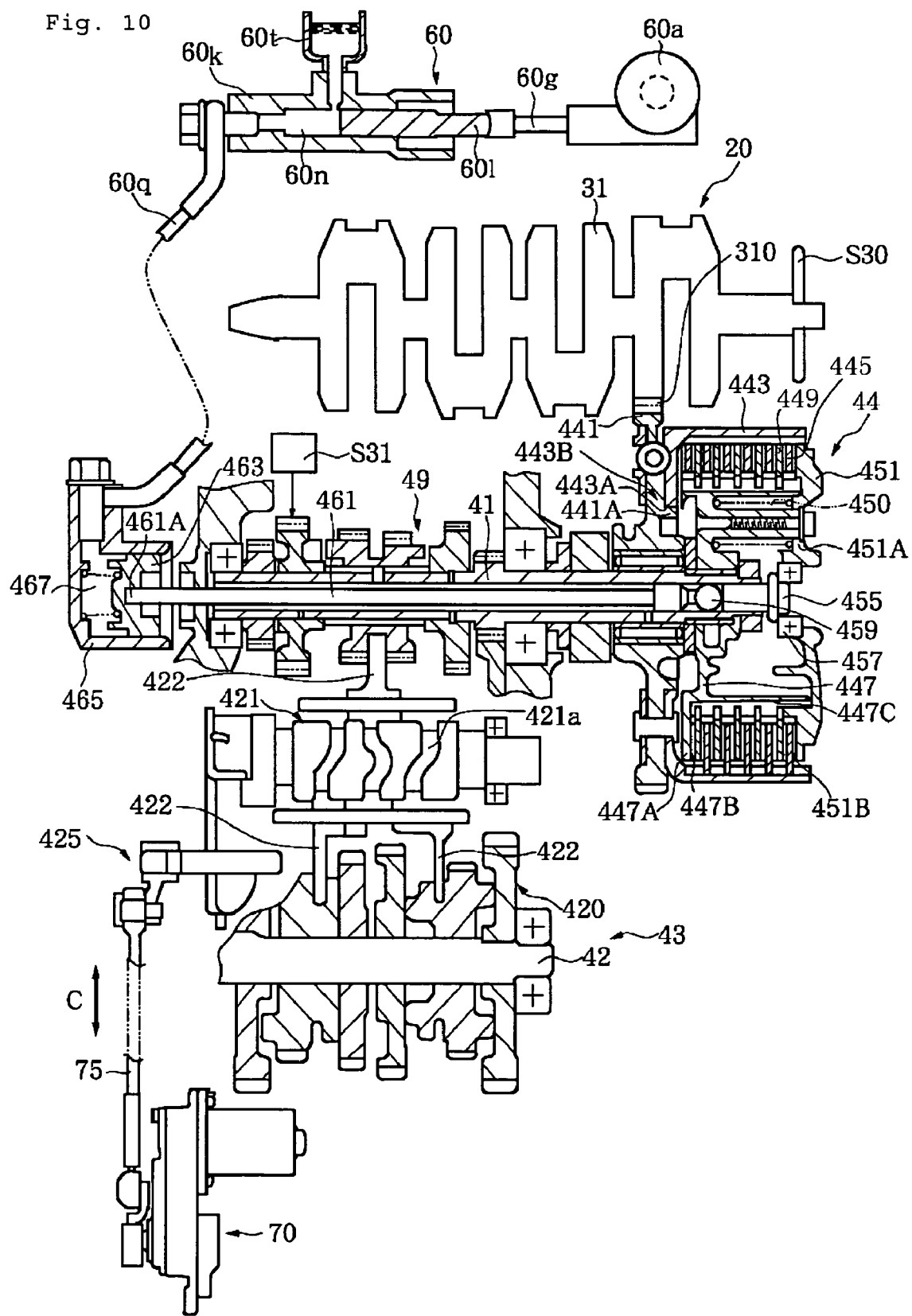
FIG. 10 is a schematic view showing portions of the engine and transmission of the motorcycle of FIG. 1 in cross-section.

As shown in FIG. 1, the engine 20 drives the rear wheel through a transmission 40; however, in other applications, the engine can drive a front wheel or wheels or can drive one or more front and rear wheels on the vehicle (e.g., all wheel drive). In the illustrated embodiment, which is best seen in FIGS. 5 and 10, the transmission 40 includes a main shaft 41 disposed in parallel to the crankshaft 31, a drive shaft 42 disposed in parallel to the main shaft 41, and a shift mechanism 43 including a multiple-step speed change gear 49, and is integrated with the crankcase 32. The main shaft 41 supports a clutch mechanism 44. The clutch mechanism 44 interrupts the transmission of the rotation at the switching of the speed change gear.

As seen in FIG. 1, the drive shaft 42 has a drive sprocket 48a. A chain 47 is wound around the drive sprocket 48a and a driven sprocket 48b disposed at the rear wheel 23. Thus the power of the engine is transmitted to the rear wheel 23 through the chain 47. Of course, in other applications, other types of power transmitters can be used to transmit power from the transmission to the driven component. For example, a shaft and/or gear train can be used to drive one or more wheels of a vehicle.

Figure 16:
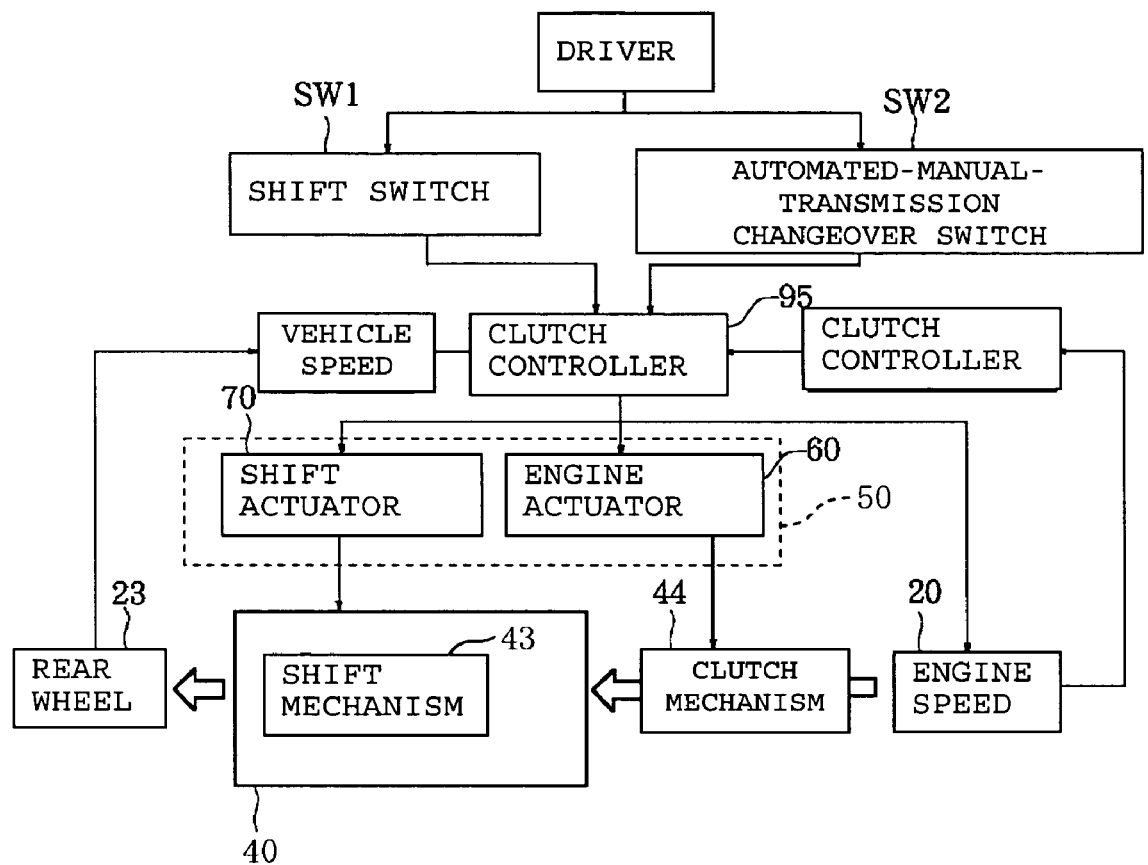
FIG. 16 is a system diagram of an automated manual transmission mechanism for the motorcycle shown in FIG. 1.

The motorcycle includes an automatic hydraulic transmission control unit 50 (which is shown in FIG. 16, and is hereinafter, referred to as an automated manual transmission mechanism). The automated manual transmission mechanism 50 automatically operates the clutch mechanism 44 and switches the speed change gear of the transmission 40, and includes a clutch actuator 60 for actuating the clutch mechanism 44, a shift actuator 70 for switching the speed change gear of the transmission 40, and other components necessary for automatic transmission control (automated manual transmission).

Figure 6:
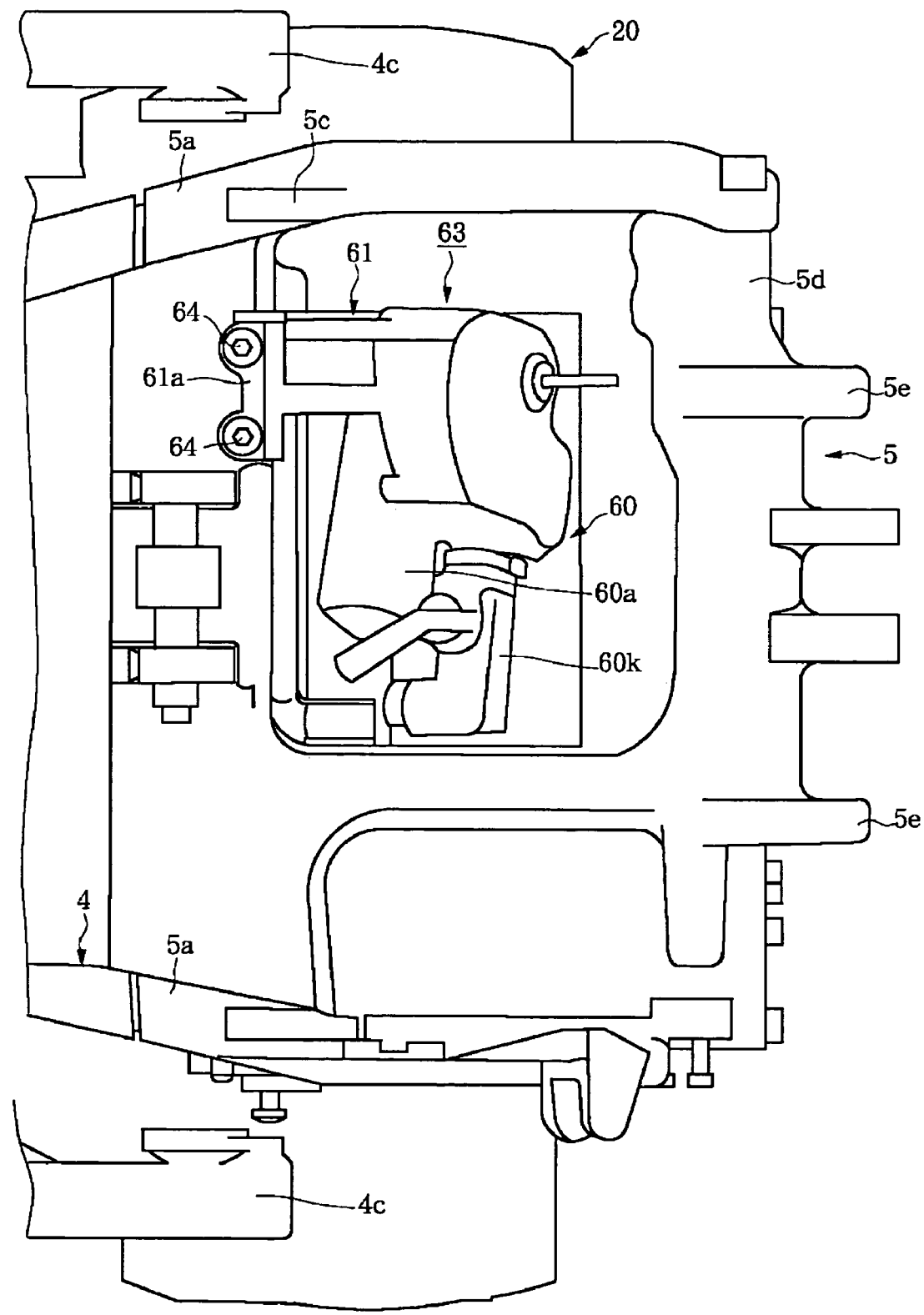
FIG. 6 is an enlarged plan view showing the arrangement of a clutch operation unit of the transmission shown in FIG. 4.
Figure 7:
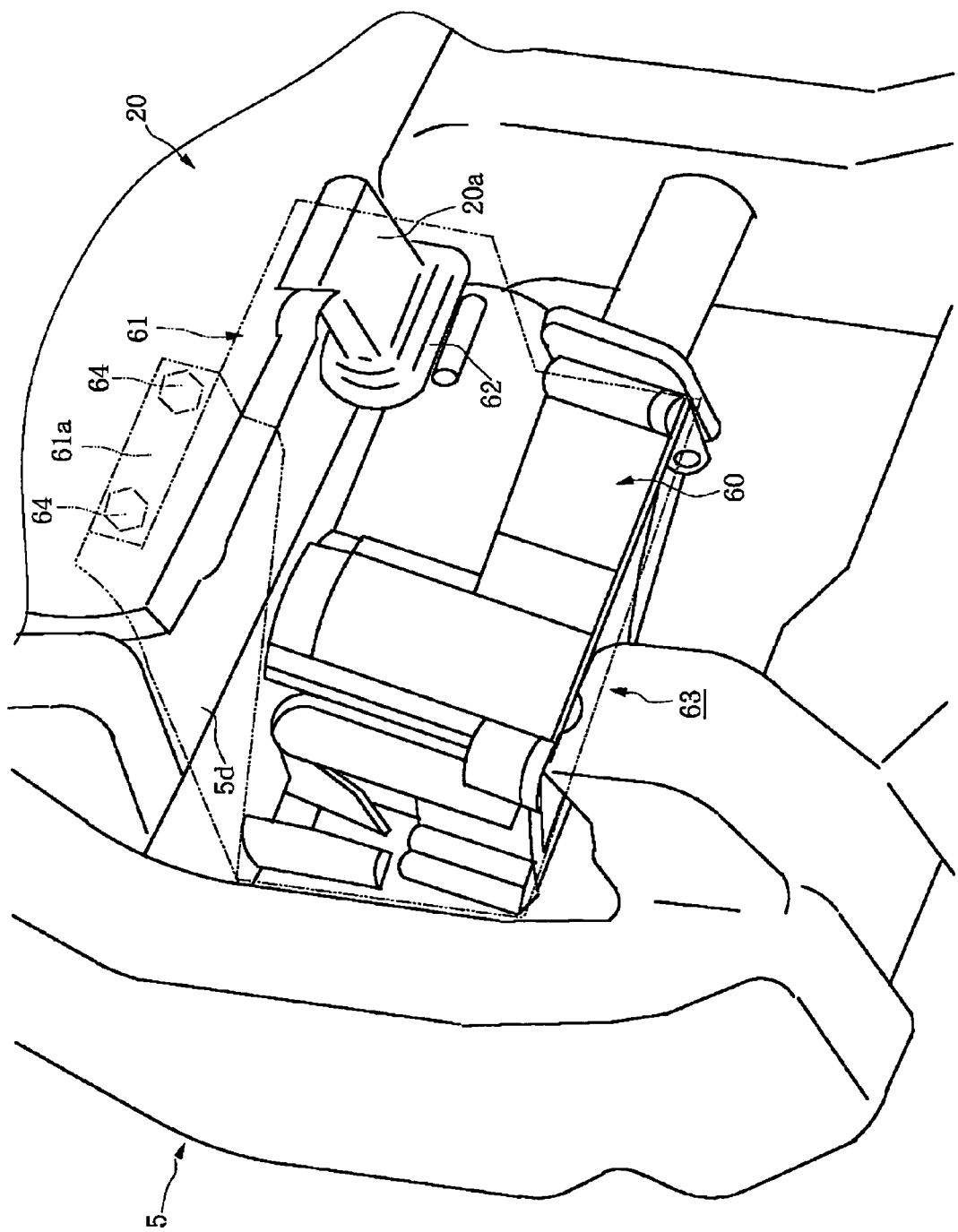
FIG. 7 is an enlarged perspective view showing the arrangement of the clutch operation unit in the motorcycle of FIG. 1.
Figure 8:
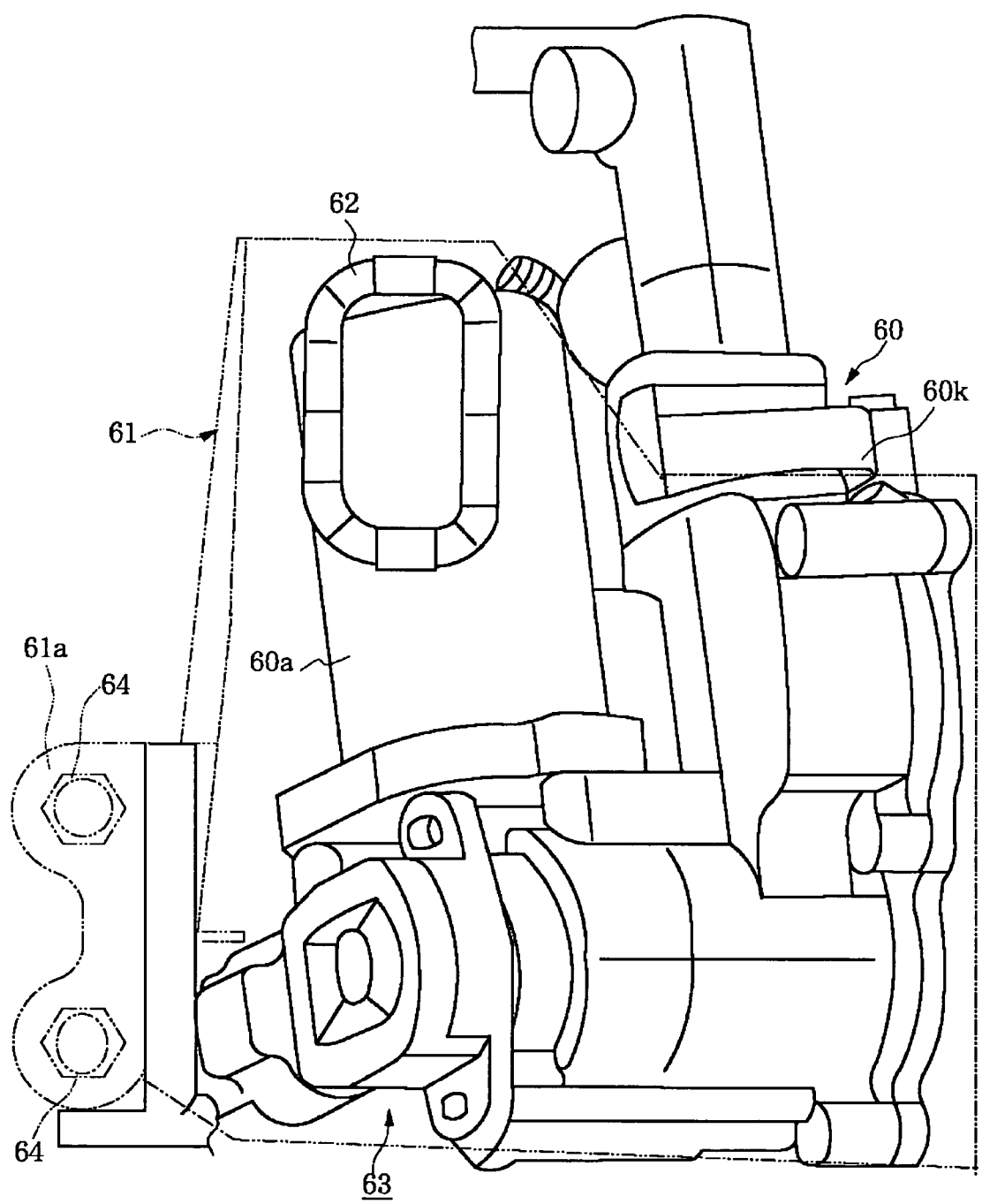
FIG. 8 is a perspective view of the clutch operation unit shown in FIGS. 6 and 7.

FIGS. 5 to 9 show the structure of the clutch actuator 60. As shown in FIG. 6, the clutch actuator 60 is formed as a clutch operation unit 63 in which various components are integrated with a mounting plate 61 (FIG. 6). Since the clutch actuator 60 is integrated with other components as the clutch operation unit 63, assembly work and maintenance thereof are facilitated. The mounting plate 61 has an engagement hole 62 formed therein (refer to FIGS. 7 and 8). As shown in FIG. 7, the clutch operation unit 63 is fixed in such a way that the engagement hole 62 is fitted over a projection 20a fixed to the rear of the engine 20, and a mounting portion 61a of the mounting plate 61 is secured to the member 5d of the rear-arm bracket 5 with fasteners 64 such as bolts. The position of the clutch operation unit 63 is surrounded by the rear-arm bracket 5 behind the engine 20, as viewed from the side (refer to FIG. 1), so as to be generally shielded.

Figure 9:
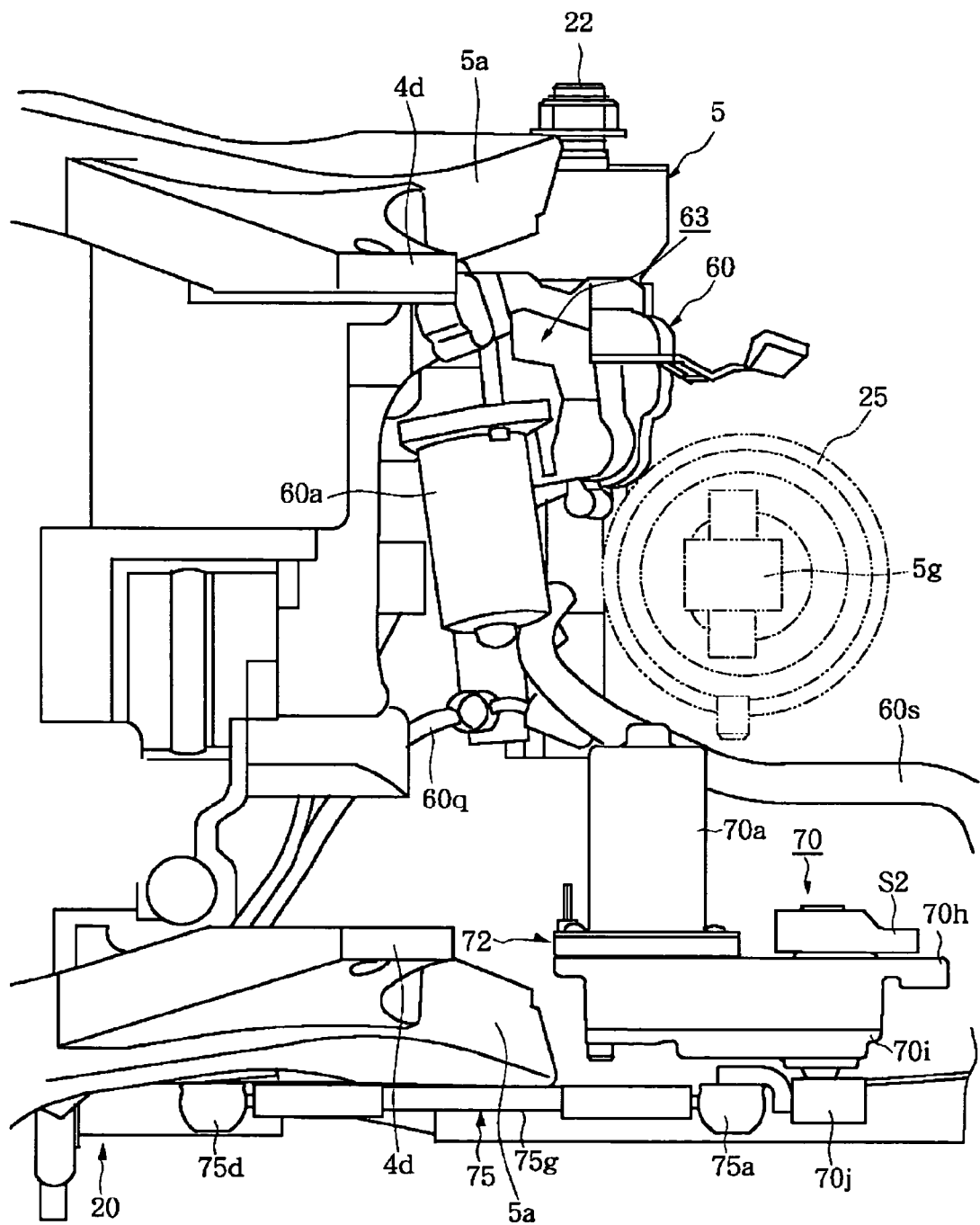
FIG. 9 is an enlarged plan view showing the arrangement of the actuator of FIG. 4.

As shown FIGS. 5 and 9, the shift actuator 70 is integrated with a shift-position detector S2 (refer to FIG. 9), which together form at least part of a shift control unit 72. Integration as the shift control unit 72 facilitates assembly work, maintenance and the like. As shown in FIG. 5, a mounting bracket 73 is fixed to the back stay 7. The shift control unit 72 is mounted such that the shift actuator 70 is fixed to the mounting bracket 73 with fasteners 74 such as bolts. In this manner, the shift control unit 72 is disposed opposite to the transmission 40 with the main frame 4 therebetween, as viewed from the side, and the shift actuator 70 is located behind the main frame 4.

The shift mechanism 43 and the shift actuator 70 are operatively coupled together by a transmitter, which in the illustrated embodiment, takes the form of a shift rod 75; however, other types of transmitters can also be used, such as, for example, a belt, a parallel cable assembly, gears, and the like. As illustrated, the shift rod 75 crosses the body frame 2, as viewed from the side. In this embodiment, as shown in FIG. 2, the rears of the two frames 4a extend downward to connect to the right and left of the rear-arm bracket 5 at the connecting portions 4b. The shift rod 75 crosses the connecting portions 4b (refer to FIG. 5). The connecting portions 4b are bent inward along the width of the vehicle to form a small width as described above (refer to FIG. 2).

With reference now to FIG. 10, the detailed structure of the clutch mechanism 44 will be described. The clutch mechanism 44 of this embodiment is, for example, a multiple-disc friction clutch, which includes a clutch housing 443; a plurality of friction discs 445 are integrated with the clutch housing 443 and function as friction plates; a clutch boss 447; and a plurality of clutch plates 449 serving as friction plates integrated with the clutch boss 447. Other types of positive or friction clutch mechanism can also be used with the transmission.

The crankshaft 31 of the engine 20 supports a gear 310. The main shaft 41 supports a gear 441 that rotates about the main shaft 41 and lies in engagement with the gear 310. The clutch housing 443 preferably is integrated with the gear 441. Torque is transmitted from the crankshaft 31 to the clutch housing 443 via the gear 441. Torque is then transmitted from the clutch housing 443 to the clutch boss 447 by the friction generated between the plurality of friction discs 445 and the plurality of clutch plates 449.

The gear 441 is supported rotatably at a first end of the main shaft 41 (on the right side in FIG. 10). The clutch housing 443 is integrated with the boss of the gear 441. Thus, it can rotate around the main shaft 41 with limitations to the movement along the axis of the main shaft 41. The clutch boss 447 is integrated with the first end of the main shaft 41 (closer to the end relative to the gear 441).

The clutch boss 447 is disposed inside the cylindrical clutch housing 443. The rotation centers of the gear 441, the clutch housing 443, the clutch boss 447, and the main shaft 41 are the same, being formed generally as concentric circles.

In the illustrated embodiment, a cylindrical engaging projection 441A is provided on the boss of the gear 441. An engaging portion 443B having an engaging hole 443A that is to be fitted on the engaging projection 441A is provided at a first end of the cylindrical clutch housing 443 (on the left in FIG. 10). The clutch housing 443 is fixed to the gear 441 by the engaging projection 441A fitted in the engagement hole 443A.

The friction discs 445 are each a ring-shaped thin plate. The outer rim of the friction disc 445 is supported by the inner circumference of the cylindrical clutch housing 443 such that the plane of the friction disc 445 is substantially perpendicular to the axis of the main shaft 41. This allows the friction discs 445 to move slightly along the rotation axis of the main shaft 41 relative to the clutch housing 443, and limits the relative rotation of the clutch housing 443 in the rotating direction of the main shaft 41.

The planes of the friction discs 445 have a specified clearance therebetween (slightly larger than the thickness of the clutch plate 449).

The clutch boss 447 preferably is cylindrical, and has, at a first end of the clutch boss 447 (on the left in FIG. 10), a circular flange 447A whose outside diameter is substantially equal to that of the clutch plate 449. Around the outer circumference of the cylinder of the clutch boss 447, a plurality of the clutch plates 449 are supported. This allows the clutch plates 449 to move slightly along the axis of the main shaft 41 relative to the clutch boss 447, and limits the relative rotation of the clutch boss 447 in the rotating direction of the main shaft 41.

The clutch boss 447 is fixed to the first end of the main shaft 41 (on the right in FIG. 10) such that the flange 447A is located on the side of the clutch housing 443 adjacent to the engaging portion 443B.

The clutch plates 449 are each a ring-shaped thin plate. The inner rim of the clutch plate 449 is supported by the outer circumference of the cylindrical clutch boss 447 such that the plane of the clutch plate 449 is substantially perpendicular to the rotation axis of the main shaft 41. The planes of the clutch plates 449 have a specified clearance therebetween (slightly larger than the thickness of the friction disc 445).

The outside diameter of the clutch plate 449 is slightly smaller than the inside diameter of the cylindrical clutch housing 443. The inside diameter of the friction disc 445 is slightly larger than the outside diameter of the cylindrical clutch boss 447. The friction discs 445 and the clutch plates 449 are arranged alternately along the axis of the main shaft 41. Between each of the friction discs 445 and each of the clutch plates 449, slight clearance is present along the axis of the main shaft 41.

There is a pressure section 447B constructed of the flanges 447A of the clutch boss 447 on the side of the clutch housing 443 adjacent to the engaging portion 443B (on the left in FIG. 10). The pressure section 447B is disposed outside the alternate friction discs 445 and clutch plates 449 and on the outer end of the main shaft 41 along the axis. The pressure section 447B selectively holds the friction discs 445 and the clutch plates 449 together with a pressure plate 451 along the rotation axis of the main shaft 41 to generate friction between each friction disc 445 and each clutch plate 449.

The cylindrical clutch boss 447 has a plurality of cylindrical guides 447C integrated therewith and extending along the axis of the main shaft 41. The pressure plate 451 includes a plurality of guides 451A that is in engagement with the guides 447C. The pressure plate 451 can move relative to and simultaneously with the clutch boss 447 by the guides 447C and the guides 451A, along the axis of the main shaft 41. The pressure plate 451 is driven and controlled by the clutch actuator 60.

The pressure plate 451 has a planer pressure section 451B. The pressure section 451B is substantially parallel with the planes of the friction discs 445 and the clutch plates 449.

The clutch mechanism 44 includes a plurality of springs 450 such that they surround the cylindrical guides 447C, respectively. The springs 450 bias the pressure plate 451 to the left in FIG. 10. In other words, the springs 450 bias the pressure plate 451 in the direction in which the pressure section 451B of the pressure plate 451 comes close to the pressure section 447B of the clutch boss 447.

The pressure plate 451 is in rotatable engagement with a first end of a push rod 455 (on the right in FIG. 10) in the center thereof, for example, via a deep-groove ball bearing 457 or the like. A second end of the push rod 455 (on the left in FIG. 10) is in engagement with the inside of the first end of the cylindrical main shaft 41. Inside the cylindrical main shaft 41, a spherical ball 459 is provided next to the second end (the left end) of the push rod 455, and a push rod 461 is provided at a left side of the ball 459.

A first end 461A of the push rod 461 projects from a second end of the cylindrical main shaft 41. The projecting first end 461A of the push rod 461 is integrated with a piston 463 that constructs part of the clutch actuator 60. The piston 463 is guided by a cylinder body 465 to slide freely along the rotation axis of the main shaft 41.

When hydraulic fluid as an example of compressed fluid is supplied into a space 467 surrounded by the piston 463 and the cylinder body 465, the piston 463 is pushed to the right in FIG. 10. Thus the piston 463 moves the pressure plate 451 to the right in FIG. 10 via the push rod 461, the ball 459, the push rod 455, and the deep-groove ball bearing 457. When the pressure plate 451 is pushed to the right in FIG. 10 in this manner, the pressure section 451B of the pressure plate 451 is separated from the friction discs 445, so that the clutch is brought out of engagement.

When the clutch mechanism 44 is brought into engagement, the pressure plate 451 is biased by the springs 450 toward the flange 447A of the clutch boss 447 (to the left in FIG. 10). Thus, the friction discs 445 and the clutch plates 449 are sandwiched between the pressure section 447B of the clutch boss 447 and the pressure section 451B of the pressure plate 451 to generate friction between the friction discs 445 and the clutch plates 449, thus allowing transmission of torque from the clutch housing 443 to the clutch boss 447.

When the clutch mechanism 44 is to be out of engagement (in a disengaged condition in which no torque is transmitted), the pressure plate 451 is moved by the push rod 455 to the right in FIG. 10. Thus, the pressure section 451B of the pressure plate 451 is separated from the friction disc 445, which is located closest to the pressure section 451B of the pressure plate 451 (the rightmost friction disc 445 in FIG. 10). In this state, the friction discs 445 and the clutch plates 449 are not sandwiched, and so there exists a slight clearance therebetween. Accordingly, friction capable of transmitting torque is not generated between the friction discs 445 and the clutch plates 449.

Thus the pressure plate 451 is moved to one end or the other end along the axis of the main shaft 41 depending on the driving force of the clutch actuator 60 and the biasing force of the springs 450. In response to the movement, the clutch is brought into engagement (into a condition in which power can be transmitted) or out of engagement (into a condition in which no power can be transmitted). In other words, when the push rod 455 moves to the right in FIG. 10 against the biasing force of the springs 450, or in the direction in which the pressure section 451B of the pressure plate 451 separates from the pressure section 447B of the clutch boss 447, the pressure plate 451 is also moved by the force of the push rod 455. In contrast, when the push rod 455 moves to the left in FIG. 10, the pressure plate 451 is pushed to the left by the biasing force of the springs 450 and so moved to the left as does the push rod 455.

To bring the clutch mechanism 44 from an engaged state to a disengaged state, a clutch motor 60a of the clutch actuator 60 is actuated to move an output shaft 60g to the left in FIG. 10. By the movement of the output shaft 60g, a piston 601 of a cylinder 60k is pushed to the left in FIG. 10 and, as such, the working fluid (e.g., oil) present in an fluid chamber 60n passes through a hose 60q into the space 467 surrounded by the cylinder body 465 and the piston 463 to move the piston 463 to the right in FIG. 10. The fluid chamber 60n communicates with a reserve tank 60t through a reserve hose 60s (refer to FIG. 4) and a check valve. The reserve tank 60t preferably is supported by the seat rail 6.

The pressure plate 451 is pushed by the rightward movement of the piston 463 via the push rod 461, the ball 459, the push rod 455, and the deep-groove ball bearing 457. When the pressure becomes larger than the force that the springs 450 bias the pressure plate 451 to the left in FIG. 10, the pressure plate 451 moves to the right in FIG. 10. The pressure section 451B of the pressure plate 451 is thus separated from the friction discs 445 to bring the clutch out of engagement.

A case in which the clutch mechanism 44 is brought from a disengaged state to an engaged state will now be described. With the clutch mechanism 44 in a disengaged state, the piston 463 of the clutch actuator 60 pushes the pressure plate 451 to the right in FIG. 10 via the push rod 461, the ball 459, the push rod 455, and the deep-groove ball bearing 457 to keep the pressure section 451B of the pressure plate 451 apart from the friction discs 445. Also in this state, the pressure plate 451 is biased by the springs 450 to the left in FIG. 10. Thus, the piston 463 is biased to the left in FIG. 10 via the deep-groove ball bearing 457, the push rod 455, the ball 459, and the push rod 461. Since the piston 463 is biased, the piston 601 of the clutch actuator 60 is also biased to the right in FIG. 10 by the oil flowing in the oil hose 60q.

When the output shaft 60g of the clutch actuator 60 moves gradually from left to the right in FIG. 10, with its initial position corresponding to a disengaged state of the clutch mechanism 44, the piston 601 also moves to the right in FIG. 10. By the movement of the piston 601, hydraulic fluid flows from the space 467 surrounded by the cylinder body 465 and the piston 463 into the fluid chamber 60n through the hose 60q.

By the movement of the hydraulic fluid, the piston 463 biased by the pressure plate 451 and the springs 450 are moved to the left in FIG. 10. This also moves the pressure plate 451 to the left in FIG. 10. The clutch mechanism 44 thus starts engagement (starts transmission of power), further moving the pressure plate 451 to the left in FIG. 10. Then the friction generated between the friction discs 445 and the clutch plates 449 is increased by the biasing force of the springs 450. As a result, most of the relative sliding of the friction discs 445 and the clutch plates 449 is eliminated, thus completing the engagement of the clutch.

As also illustrated in FIG. 10, the transmission additionally includes the shift mechanism 43, which will now be described.

The engine 20 has an engine speed sensor S30 at the end of the crankshaft 31. The crankshaft 31 is joined to the main shaft 41 via the multiple-disc clutch mechanism 44. To the main shaft 41, the multiple-step speed change gear 49 and a main-shaft speed sensor S31 are mounted. The speed change gear 49 on the main shaft 41 is in engagement with a corresponding speed change gear 420 mounted on the drive shaft 42 (which is illustrated out of engagement in the figure). One or both of the speed change gear 49 and the speed change gear 420 (except a selected pair of speed change gears) are mounted to the main shaft 41 or the drive shaft 42 in a tickover condition (at idle). Thus, the rotation is transmitted from the main shaft 41 to the drive shaft 42 only via the selected pair of speed change gears.

The shift operation of changing the change gear ratio by selecting the speed change gear 49 and the speed change gear 420 is performed by a shift cam 421 serving as a shift input shaft. The shift cam 421 has multiple cam grooves 421a, to which shift forks 422 are mounted. The shift forks 422 are in engagement with a specified speed change gear 49 on the main shaft 41 and a specified speed change gear 420 on the drive shaft 42. When the shift cam 421 rotates, the shift forks 422 move axially along the cam groove 421a. Then only a pair of the speed change gear 49 and the speed change gear 420 in the position corresponding to the rotation angle of the shift cam 421 is fixed to the main shaft 41 and the drive shaft 42 by a spline, respectively. The position of the speed change gears is thus determined. Accordingly, transmission of the rotation between the main shaft 41 and the drive shaft 42 is executed at a specified speed change ratio via the speed change gear 49 and the speed change gear 420.

The shift mechanism 43 moves the shift rod 75 back and forth along the arrow C by the operation of the shift actuator 70, and rotates the shift cam 421 by a specified angle via a shift link mechanism 425. Thus, the shift forks 422 moves axially by a specified angle along the cam grooves 421a to fix a pair of the speed change gear 49 and the speed change gear 420 to the main shaft 41 and the drive shaft 42 in order, respectively, thereby transmitting the rotation at a speed reducing ratio. While the shift mechanism 43 is illustrated as a simple multi-speed transmission, the transmission can also have other configurations, such as, for example, a continuously variable automatic transmission with multiple speeds.

Figure 11:
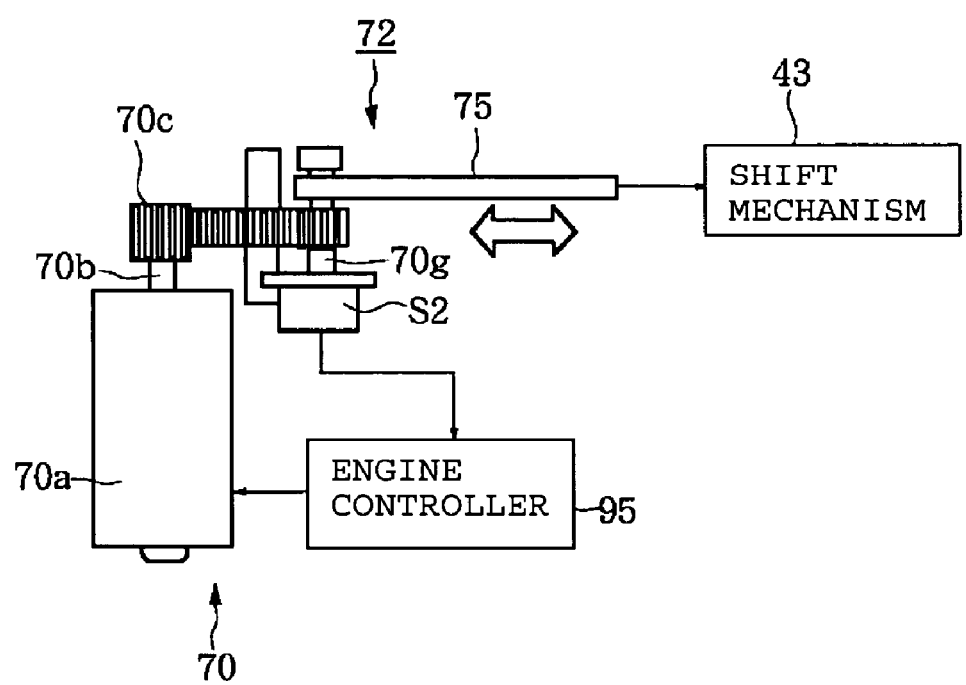
FIG. 11 is a schematic diagram of a clutch actuator, a shift rod, and a shift mechanism of the transmission.
Figure 12:
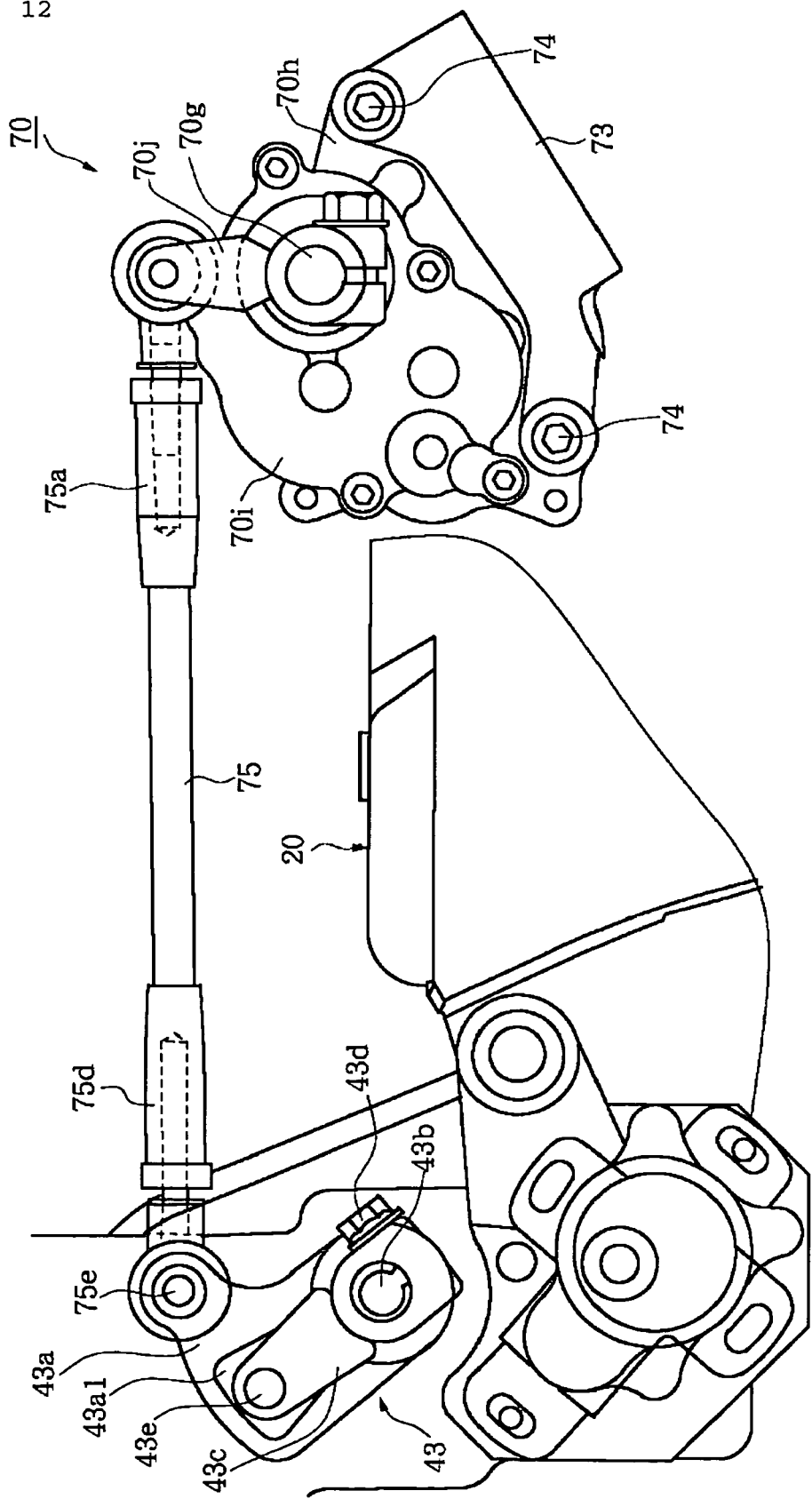
FIG. 12 is a side view of the clutch actuator, the shift rod, and the shift mechanism of the transmission.
Figure 13:
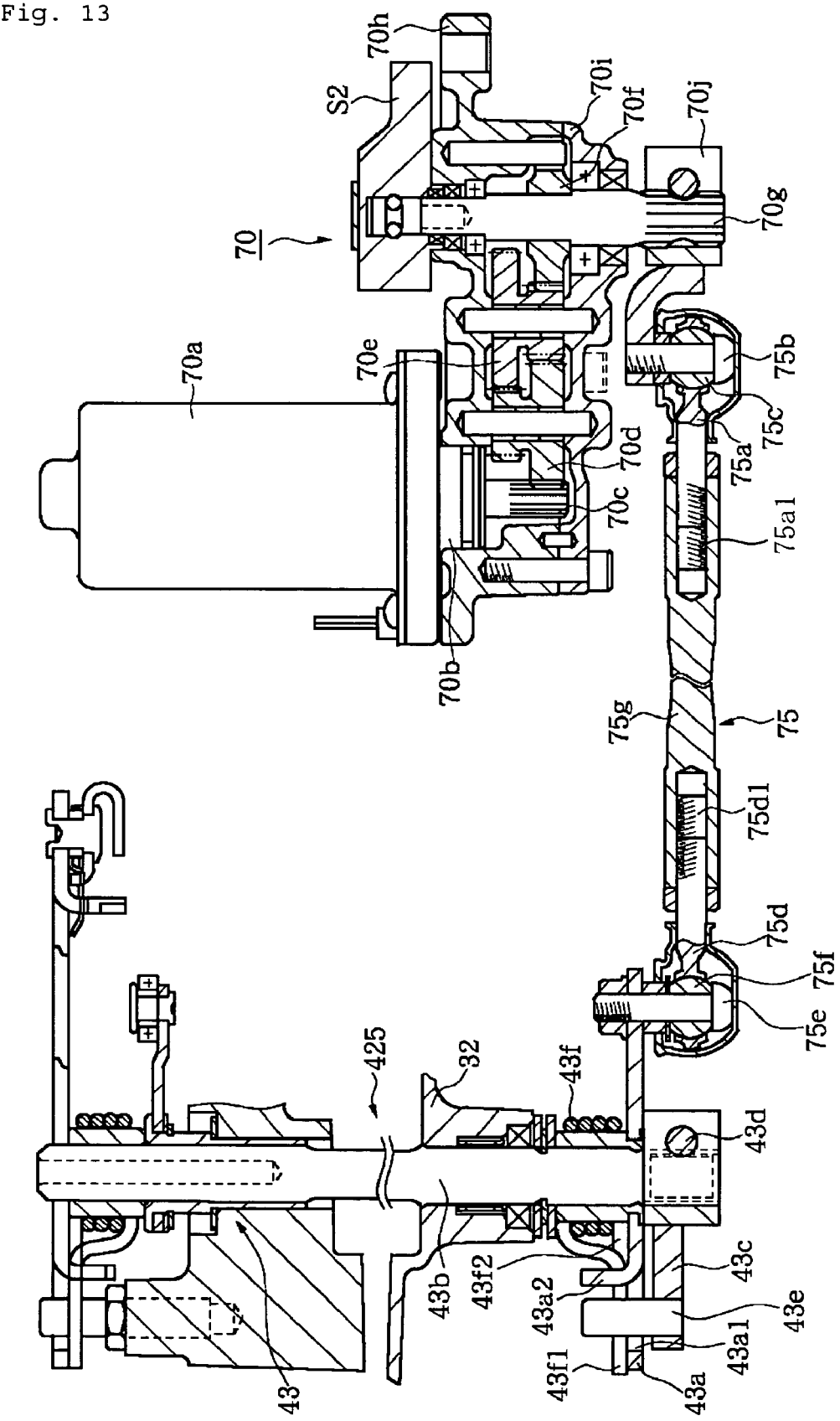
FIG. 13 is a cross-sectional view of the clutch actuator, the shift rod, and the shift mechanism of the transmission.

With reference now to FIGS. 11 to 14, a more detailed structure of the shift actuator 70 and the shift mechanism 43 will be described. The shift actuator 70 may be driven by hydraulic fluid or electricity. As shown in FIG. 11, the shift actuator 70 of this embodiment includes a shift motor 70a that rotates according to a signal from an engine controller 95. A gear 70c on a motor shaft 70b is rotated with the rotation of the shift motor 70a. As shown in FIG. 13, with the rotation of the gear 70c, a first reduction gear 70d, a second reduction gear 70e, and a third reduction gear 70f are rotated synchronously to rotate a drive shaft 70g. The first reduction gear 70d, the second reduction gear 70e, and the third reduction gear 70f construct a reduction mechanism for reducing the rotation of the shift motor 70a. The reduction mechanism preferably is housed in gear cases 70h, 70i. The gear 70c of the motor shaft 70b, the first reduction gear 70d, the second reduction gear 70e, the third reduction gear 70f, and the drive shaft 70g form a power transmission mechanism that transmits the rotation of the shift motor 70a.

As shown in FIG. 12, the drive shaft 70g has a control lever 70j. The control lever 70j connects to a shift-actuator-side connecting portion 75a of the shift rod 75 with a bolt 75b (refer to FIG. 13). As shown in FIG. 13, the shift-actuator-side connecting portion 75a can rotate around the bolt 75b using a bearing 75c.

Figure 14:
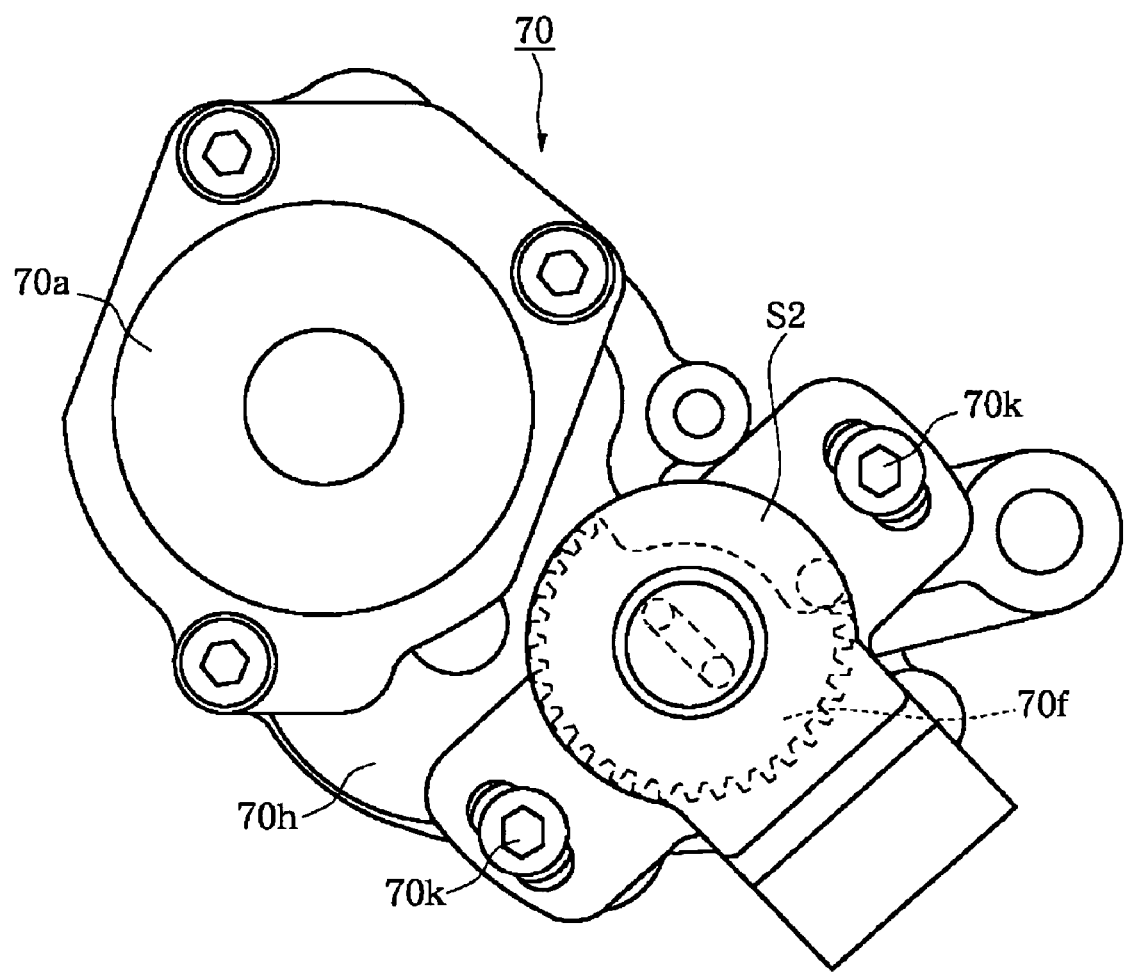
FIG. 14 is a side view of the clutch actuator shown in FIG. 4.

The drive shaft 70g of the power transmission mechanism has a shift-position detector S2. The shift-position detector S2 is disposed at the end of the drive shaft 70g. As shown in FIG. 14, the shift-position detector S2 is fixed to the gear case 70h with fasteners such as bolts 70k. As shown in FIG. 11, the shift-position detector S2 obtains positional information from the rotation of the drive shaft 70g, and sends a signal indicative of the positional information to the engine controller 95. The engine controller 95 controls the shift motor 70a at least in part according to the positional information.

As shown in FIGS. 12 and 13, a shift-mechanism-side connecting portion 75d of the shift rod 75 connects to a shift control lever 43a of the shift mechanism 43 with a bolt 75e. As shown in FIG. 13, the shift-mechanism-side connecting portion 75d can rotate around the bolt 75e using a bearing 75f. The shift control lever 43a can rotate around a shift control shaft 43b. To the end of the shift control shaft 43b, an arm 43c is secured with a bolt 43d. A pin 43e fixed to the arm 43c passes through an opening 43a1 of the shift control lever 43a. A spring 43f is wound around the shift control shaft 43b. A first end 43f1 of the spring 43f is in engagement with the pin 43e, and a second end 43f2 is in engagement with an engage piece 43a2 of the shift control lever 43a.

As shown in FIG. 12, when the shift rod 75 moves, the shift control lever 43a is moved. The shift control lever 43a rotates the arm 43c via the pin 43e that passes through the opening 43a1. The shift control shaft 43b is rotated with the rotation of the arm 43c to automatically switch the multiple-step speed change gear 49 (refer to FIG. 10) of the shift mechanism 43. When a torque is generated in the shift control shaft 43b at the switching, the torque is absorbed by the spring 43f (refer to FIG. 13), so that it is not transmitted to the shift rod 75 via the shift control lever 43a.

As shown in FIG. 13, a first end of the rod 75g of the shift rod 75 (on the right in FIG. 13) is screwed to a screw 75a1 of the shift-actuator-side connecting portion 75a, while a second end of the rod 75g (on the left in FIG. 13) is screwed to a screw 75d1 of the shift-mechanism-side connecting portion 75d. Accordingly, the screwed amounts of the screws 75a1 and 75d1 vary the length of the shift rod 75 so that it's length can easily be adjusted. In this way, the length of the shift rod 75 can easily be controlled only by the rotation of the rod 75g, thus increasing the flexibility of the position of the shift actuator 70.

Figure 15:
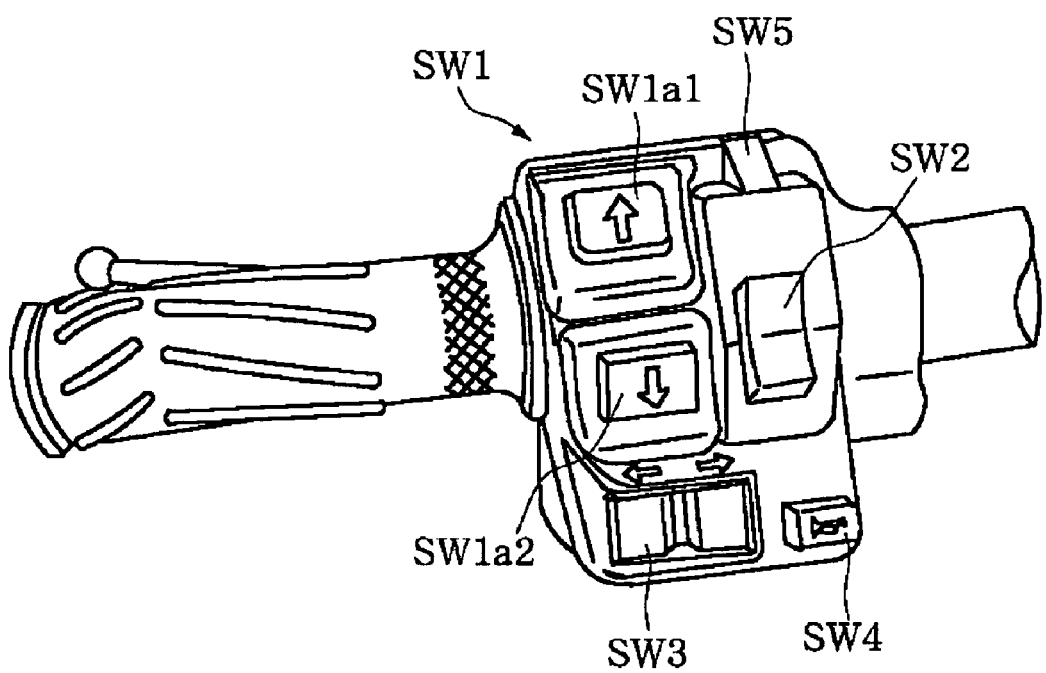
FIG. 15 is a perspective view of a switch section of a handle grip on the motorcycle shown in FIG. 1.

The operational system of the automated manual transmission mechanism will be described in detail. As shown in FIG. 15, the steering handle 11 has, for example, a shift switch SW1 on the left grip. The shift switch SW1 includes, for example, a shift-up switch SW1a1 and a shift-down switch SW1a2, and changes the shift position of the speed change gear between the first to the highest speed (e.g., a sixth speed) as appropriate by manual operation of a driver. The left grip also preferably has a changeover switch SW2, an indicator SW3, a horn SW4, and a light switch SW5. The changeover switch SW2 switches the gear shift between a semi-auto mode and a full-auto mode.

As shown in FIG. 16, the switching of the shift mechanism 43 and the clutch mechanism 44 is executed by the automated manual transmission mechanism 50. For this system, the motorcycle 1 includes various sensors, such as a clutch-position detector of the clutch actuator 60 (not shown) and a speed sensor, in addition to the shift position detector S2 of the shift actuator.

The engine controller 95 drives the clutch actuator 60 and the shift actuator 70 according to data sensed by the sensors and the instruction of the shift switch SW1. Specifically, a series of shift operation of the disengagement of the clutch mechanism 44, the switching of the speed change gear of the transmission 40, and the connection of the clutch mechanism 44 is performed automatically according to a specified program stored in the engine controller 95 and by other arithmetic circuits.

As described above, the shift actuator 70 of this embodiment is not mounted directly to the engine 20 but is fixed to the back stay 7 via the mounting bracket 73. This can therefore reduce the influences of the heat and vibration of the engine 20 to the shift actuator 70. Also, the shift actuator 70 can be disposed compactly, in a position where it does not overlap with the main frame 4 and does not project outward from the side of the vehicle, thus increasing the spread of the driver's legs.

In this embodiment, the shift rod 75 crosses outside the main frame 4 (outside the width of the vehicle and on the lower side in FIG. 2(a)), as viewed from the side. Accordingly, the shift actuator 70 can be disposed in a compact position where it does not overlap with the main frame 4 and does not project to the side of the vehicle. Alternatively, the shift rod 75 may be disposed inside the connecting portions 4 of the main frame 4 (within the width of the vehicle), as shown in FIG. 2(b), or may cross the connecting portions 4b, as shown in FIG. 2(c).

As noted above, the body frame 2 illustrated in FIG. 2(a) includes the rear-arm bracket 5 extending downward from the rear of the main frame 4; the seat rail 6 connected to the main frame 4; and the back stay 7 connected to the main frame 4 or the rear-arm bracket 5 behind the connecting portion 4d of the main frame 4 with the seat rail 6. The shift rod 75 crosses the part between the connecting portion 4d of the main frame 4 with the seat rail 6 and the connecting portion 5b with the back stay 7, as viewed from the side. In this embodiment, the rears of the two frames 4a of the main frame 4 extend downward to be joined to the right and left of the rear-arm bracket 5. The shift rod 75 crosses the connecting portions 4b. The connecting portions 4b are bent inward along the width of the vehicle to form a small width. This can further prevent the shift rod 75 from projecting to the side of the vehicle, thus allowing a more compact arrangement of the shift actuator 70.

The portion where the shift rod 75 crosses the body frame 2 is not limited to the location illustrated in the present embodiment. The shift rod 75 may cross an appropriate portion of the body frame 2 by the arrangement of the shift mechanism 43 and the shift actuator 70.

In this embodiment, the shift motor 70a of the shift actuator 70 is disposed in the region 100 (refer to FIG. 4) surrounded by the main frame 4, the rear-arm bracket 5, the seat rail 6, and the back stay 7, as viewed from the side. Thus the shift motor 70a can be disposed in the narrow space under the seat 14. This can prevent the projection of the shift actuator 70 to the side of the vehicle, allowing for a compact arrangement of the shift actuator 70. Additionally, in this embodiment, the length of the shift rod 75 can easily be adjusted, so that the flexibility of the position of the shift actuator 70 is increased. Moreover, because the automatic transmission control unit 50 includes the shift control unit 72 that is a combination of the shift actuator 70 and the shift-position detector S2, and the shift control unit 72 is mounted to the body frame 2, assembly work, maintenance, and the like on the automatic transmission control unit 50 are eased.

Another advantage occurs as a result of the shift-position detector S2 detecting the shift position at the drive shaft 70g of the power transmission mechanism, which is located at the stage after the gear speed reduction (i.e., at the output end of the gear train). Accordingly, the shift-position detector S2 functions downstream from the last reduction stage of the power transmission mechanism, and so it can detect the shift position from the rotation of the drive shaft 70g with little influence of the tolerance of the reduction mechanism. This increases shift-position detection accuracy, providing a reliable shift operation.

Figure 17:
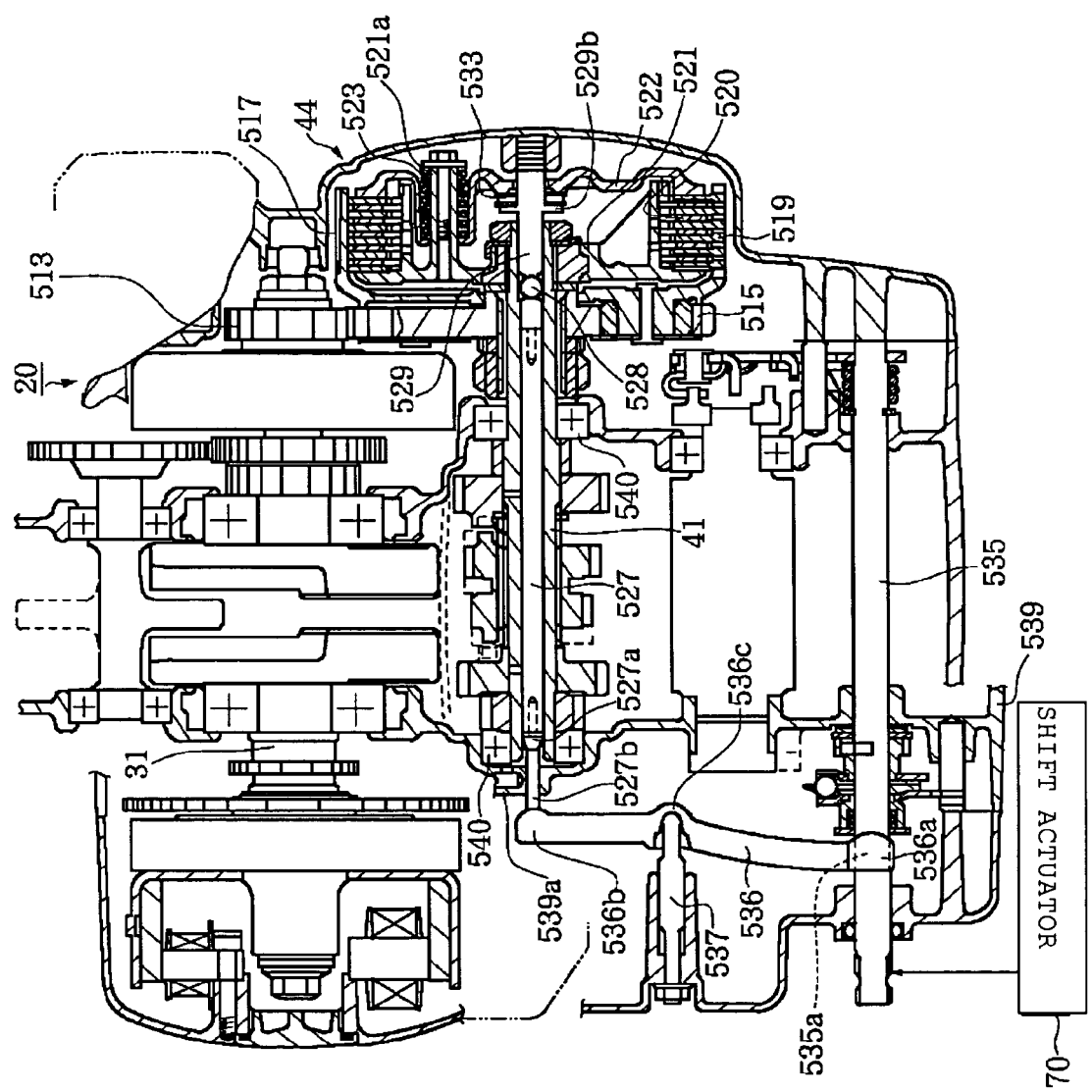
FIG. 17 is a cross-sectional view of the interior of a portion of another embodiment of an engine and an associated transmission for the motorcycle of FIG. 1.

With reference now to FIG. 17, another embodiment of the shift mechanism 43 and the clutch mechanism 44 will be described that can be used with the shift actuator 70 described above. FIG. 17 is a cross-sectional view of the interior of a portion of an engine and a transmission according to another embodiment. In this embodiment, the engine 20 includes the crankshaft 31. A driving primary reduction gear 513 disposed on the crankshaft 31 is in engagement with a driven primary reduction gear 515 that is rotatably mounted on the main shaft 41. To the driven primary reduction gear 515, a clutch housing 517 of the clutch mechanism 44 is fixed. The clutch housing 517 has multiple friction plates 519 locked to thereto with a claw (not shown) so that the power from the clutch housing 517 is transmitted to the friction plates 519. Between each of the friction plates 519, a clutch plate 520 is placed. Thus, the power is transmitted from the friction plates 519 to the clutch plates 520 by the friction face between the plates 519 and 520.

A clutch boss 521 is locked to the claw of the clutch plates 520. The power is thus transmitted from the clutch plates 520 to the clutch boss 521, and is then transmitted to the main shaft 41.

A pressure plate 522 is disposed to bring the friction plates 519 and the clutch plates 520 into pressure contact with one another. The pressure plate 522 is disposed on the boss 521a of the clutch boss 521 such that it can move in parallel with the axis of the main shaft 41. The pressure plate 522 is biased by a spring 523 in the direction in which the friction plates 519 and the clutch plates 520 are brought into pressure contact with each other.

By the pressure contact of the friction plates 519 and the clutch plates 520, the power from the clutch housing 517 is transmitted to the clutch boss 521. A first push rod 527, a ball 528, and a second push rod 529 are inserted movably into the hollow main shaft 41, which are moved to displace the pressure plate 522.

The second push rod 529 has a collar 529b. Between the collar 529b and the pressure plate 522 is interposed a bearing 533. The pressure plate 522 is rotatable, while the second push rod 529 is unrotatable.

The shift mechanism 43 has a shift shaft 535. The shift shaft 535 connects to the shift actuator 70, so that the shift shaft 535 can be rotated by the operation of the shift actuator 70. A nut 536a at a first end of a lever 536 is screwed to a male screw 535a of the shift shaft 535. A second end 536b of the lever 536 is in contact with a small-diameter portion 527b of the first push rod 527. A fulcrum 536c in the center of the lever 536 is joined to a support shaft 537. The lever 536 swings around the fulcrum 536c.

When the shift shaft 535 is rotated by the shift actuator 70 in shift operation, the nut 536a of the lever 536, which is screwed to the male screw 535a of the shift shaft 535, is moved to the left in FIG. 17. The lever 536 is swung by the movement of the nut 536a, so that the second end 536b of the lever 536 pushes the first and second push rods 527 and 529 to the right to slide them in this direction.

The pressure plate 522 is moved to the right in FIG. 17 against the biasing force of the spring 523 by the sliding of the second push rod 529, so that the pressure contact between the friction plates 519 and the clutch plates 520 is cancelled, thereby disengaging the clutch.

Since the ball 528 is disposed between the first push rod 527 and the second push rod 529, the push rods 527 and 529 can move relatively. Accordingly, one of the first push rod 527 and the second push rod 529 can be unrotatable, and the other can be rotatable. However, in this embodiment, both of the push rods 527 and 529 are unrotatable.

The first push rod 527 is inserted into the hollow main shaft 41, and has the small-diameter portion 527b at the left end, which is smaller in diameter than the other. The small-diameter portion 527b projects laterally from the left end of the main shaft 41. The projecting portion is supported by a bearing 539a of a crankcase 539. The main shaft 41 is supported by the crankcase 539 via a pair of roller bearings 540. The pressure plate 522 in one side of the main shaft 41 (on the right in FIG. 17) can be moved by the operation from the other side of the main shaft 41 (on the left in FIG. 17), so that the clutch can be disengaged.

Figure 18:
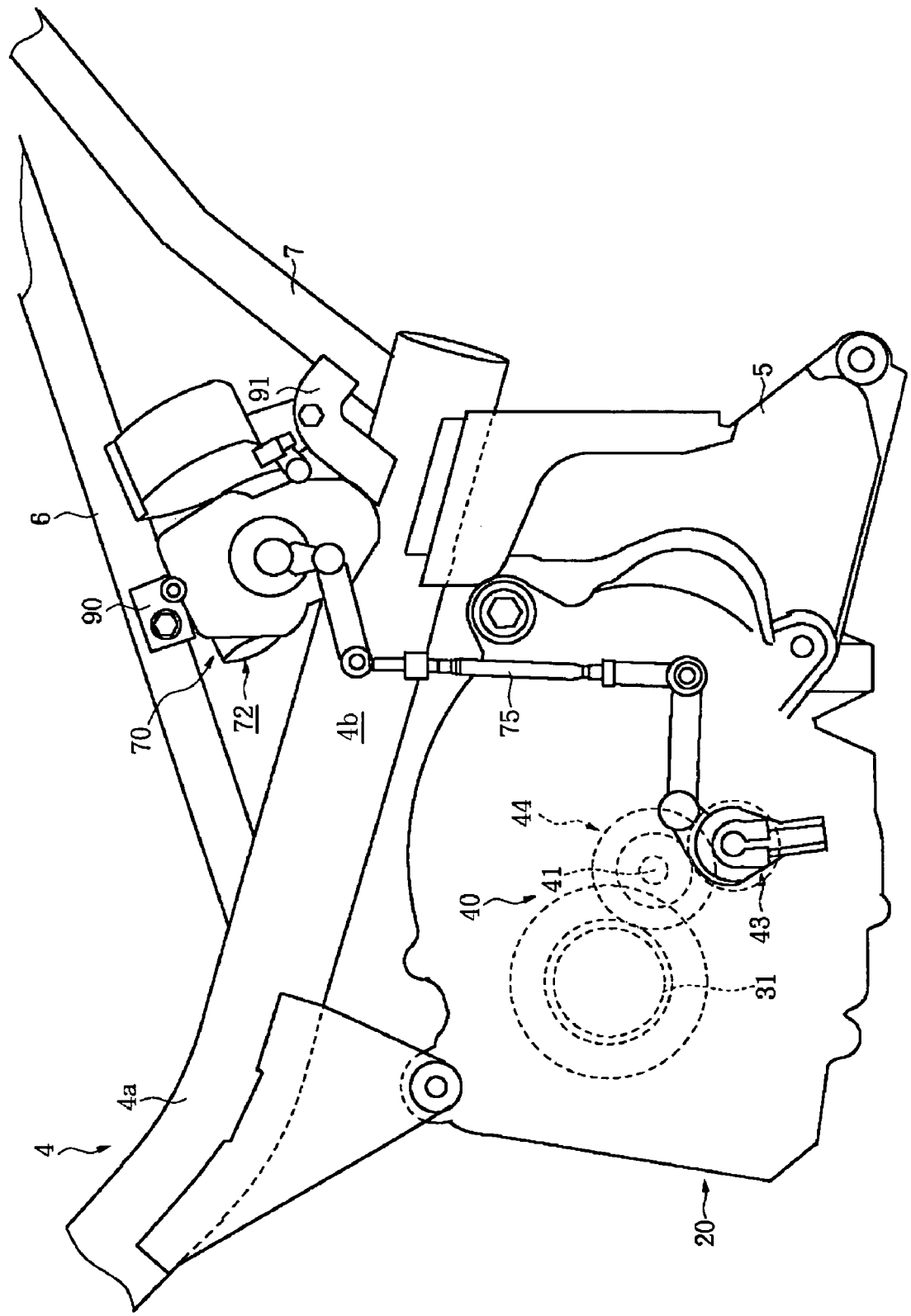
FIG. 18 is a side elevational view showing the arrangement of the actuator of an automatic transmission control unit of the transmission shown in FIG. 17.
Figure 19:
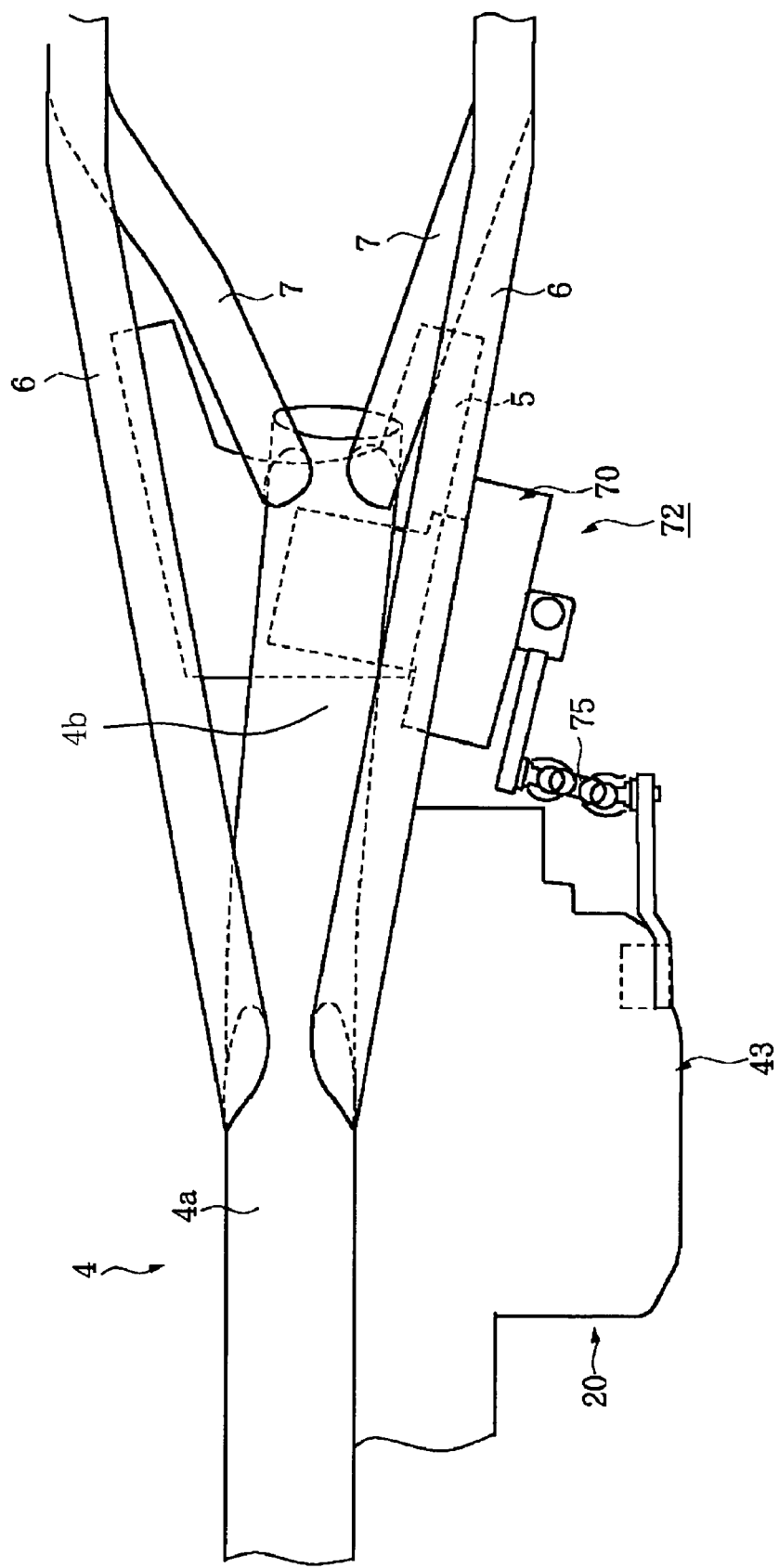
FIG. 19 is a plan view showing the arrangement of the actuator of the automatic transmission control unit of FIG. 18.

Another embodiment of a straddle-type vehicle according to an additional preferred embodiment will now be described with reference to FIG. 18. FIG. 18 is a side view showing the arrangement of the actuator of the automatic transmission control unit. FIG. 19 is a plan view showing the arrangement of the actuator of the automatic transmission control unit.

A motorcycle 1 according to this embodiment has almost the same structure as that of the first embodiment in FIGS. 1 to 17, except that the main frame 4 has one frame member 4a extending rearward from the head pipe 3. The rear-arm bracket 5 connects to the lower part of the rear of the frame member 4a (at the connecting portion 4b with the rear-arm bracket 5), and the front of the seat rail 6 and the front of the back stay 7 are joined to the upper part of the rear of the frame 4a. The engine 20 is supported by the frame 4a and the rear-arm bracket 5.

As shown in FIG. 18, in the motorcycle 1 according to this embodiment, the shift control unit 72 is disposed in the space surrounded by the frame member 4a, the seat rail 6, and the back stay 7, as viewed from the side. The shift control unit 72 is supported by a bracket 90 disposed at the seat rail 6 and a bracket 91 joined to the frame 4a and the back stay 7. Thus, in this embodiment, the shift control unit 72 is also disposed opposite to the transmission 40 with the main frame 4 therebetween, and the shift actuator 70 is disposed above the rear of the main frame 4, as viewed from the side.

The shift mechanism 43 and the shift actuator 70 are joined together with the shift rod 75. The shift rod 75 crosses the main frame 4 as viewed from the side. In this embodiment, the shift rod 75 crosses one frame 4a of the main frame 4, as shown in FIG. 18. Accordingly, as in the first embodiment, the shift actuator 70 can be disposed in a compact position where it does not overlap with the main frame 4 and does not project to the side of the vehicle.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A vehicle comprising:
a head pipe;
a body frame including a main frame extending rearward from the head pipe;
an engine supported at least in part on the body frame;
a transmission operating between the engine and a drive shaft, the transmission including a multiple-step shift mechanism;
a clutch mechanism that interrupts the transmission of power from the engine to the transmission at least when operating the shift mechanism; and
an automatic transmission control unit that operates the clutch mechanism and switches the shift mechanism automatically, the automatic transmission control unit including a shift actuator being mounted to the body frame and being disposed apart from the transmission with the body frame disposed therebetween, as viewed from the side of the vehicle, and a shift-power transmission member coupling together the shift mechanism and the shift actuator.

2. The vehicle according to claim 1, wherein the shift-power transmission member crosses the body frame as viewed from the side.

3. The vehicle according to claim 2, wherein the main frame supports at least part of the engine, and the shift-power transmission member crosses the main frame as viewed from the side.

4. The vehicle according to claim 2, wherein the body frame includes a rear-arm bracket extending downward from the rear of the main frame, a seat rail connected to the main frame, and a back stay connected to the main frame or the rear-arm bracket, behind the connected portion of the main frame and the seat rail, and the shift-power transmission member crosses the part of the frame body between the connecting portion of the main frame with the seat rail and the connecting portion with the back stay, as viewed from the side.

5. The vehicle according to claim 2, wherein the main frame includes one frame member extending rearward from the head pipe, and the shift-power transmission member crosses the frame member.

6. The vehicle according to claim 2, wherein the main frame includes two frame members extending rearward to right and left sides from the head pipe, and the shift-power transmission member crosses one of the frame members.

7. The vehicle according to claim 6, wherein that the shift-power transmission member crosses a small-width portion of the frame members that are bent inward along the width of the vehicle.

8. The vehicle according to claim 1, wherein the body frame includes a rear-arm bracket extending downward from the rear of the main frame, a seat rail connected to the main frame, and a back stay connected to the main frame or the rear-arm bracket, below the seat rail, and connected to the seat rail, behind the connected portion between the main frame and the seat rail; and the shift actuator includes a motor disposed in the region surrounded by at least the main frame, the seat rail, and the back stay, as viewed from the side.

9. The vehicle according to one of claims 1, wherein the shift-power transmission member is constructed of a shift rod that can be adjusted in length.

10. The vehicle according to one of claims 1 additionally comprising a shift control unit that includes the shift actuator and a shift-position detector that detects the shift-control position of the shift actuator, the shift control unit being mounted to the body frame.

11. The vehicle according to claim 10, wherein the shift actuator includes a shift motor, the shift control unit includes a plurality of reduction gears that reduces the rotation of the shift motor, and a power transmission mechanism that transmits the rotation driving force of the shift motor, and the shift-position detector is arranged so as to detect the shift position at a position after the gear reduction in the power transmission mechanism.

12. A vehicle comprising a body frame supporting at least in part an engine and a transmission, the transmission operating between the engine and at least one wheel of the vehicle and including a clutch mechanism and a shift mechanism, a controller, and an automatic transmission control unit connected to the clutch mechanism and the shift mechanism so as to actuate these mechanisms, the controller being configured at least to control the automatic transmission control unit so as to operate the clutch mechanism and the shift mechanism in a synchronized manner, at least part of the automatic transmission control unit being supported by the frame apart from the engine and the transmission.

13. The vehicle of claim 12, wherein the shift mechanism includes a multi-step gear mechanism.

14. The vehicle of claim 12, wherein the clutch mechanism includes a plurality of hydraulically-actuated friction clutch plates.

15. The vehicle of claim 12 additionally comprising a manually operated switch communicating with the controller to permit at least semi-manual operation of the shift mechanism.

16. The vehicle of claim 12, wherein the body frame includes a main frame and a rear-arm bracket extending downward from the rear of the main frame, a seat rail connected to the main frame, and a back stay connected to the main frame or the rear-arm bracket, behind the connected portion of the main frame and the seat rail, and at least a portion of the automatic transmission control unit crosses a part of the frame body located between the connecting portion of the main frame with the seat rail and the connecting portion with the back stay, as viewed from the side.

17. The vehicle of claim 12, wherein the frame body includes a head pipe and an main frame that includes one frame member extending rearward from the head pipe, and the shift-power transmission member crosses the frame member.

18. The vehicle of claim 12, wherein the main frame body includes a head pipe and an main frame that includes two frame members extending rearward to right and left sides from the head pipe, and the shift-power transmission member crosses one of the frame members.

19. The vehicle according to claim 18, wherein that the shift-power transmission member crosses a small-width portion of the frame members that are bent inward along the width of the vehicle.

20. The vehicle of claim 12, wherein the automatic transmission control unit includes a shift motor and a plurality of reduction gears that reduces the rotation of the shift motor, and a power transmission mechanism that transmits the rotation driving force of the shift motor, and the shift-position detector is arranged so as to detect the shift position at a position after the gear reduction in the power transmission mechanism.

* * * * *

UNITED STATES PATENT AND TRADEMARK OFFICE
CERTIFICATE OF CORRECTION

PATENT NO. : 7,575,083 B2
APPLICATION NO. : 11/255768
DATED : August 18, 2009
INVENTOR(S) : Kosugi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 751 days.

Signed and Sealed this

Seventh Day of September, 2010

David J. Kappos
*Director of the United States Patent and Trademark Office*